United States Patent
Minakuchi

(10) Patent No.: US 7,173,624 B2
(45) Date of Patent: Feb. 6, 2007

(54) ANIMATION REPRODUCTION TERMINAL, ANIMATION REPRODUCING METHOD AND ITS PROGRAM

(75) Inventor: Mitsuru Minakuchi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 10/469,095

(22) PCT Filed: Jan. 31, 2002

(86) PCT No.: PCT/JP02/00810

§ 371 (c)(1),
(2), (4) Date: Aug. 25, 2003

(87) PCT Pub. No.: WO02/073539

PCT Pub. Date: Sep. 19, 2002

(65) Prior Publication Data

US 2004/0100470 A1    May 27, 2004

(30) Foreign Application Priority Data

Mar. 6, 2001 (JP) .............................. 2001-062438

(51) Int. Cl.
*G06T 13/00* (2006.01)
(52) U.S. Cl. ...................................... 345/473; 345/475
(58) Field of Classification Search ................ 345/473, 345/474, 475; 715/744, 748
See application file for complete search history.

(56) References Cited

U.S. PATENT DOCUMENTS 5,557,716 A * 9/1996 Oka et al. .................... 345/440
5,959,672 A    9/1999 Sasaki
6,081,278 A * 6/2000 Chen ........................... 345/473
6,268,869 B1 * 7/2001 Ugajin et al. ................ 345/619
6,404,435 B1 * 6/2002 Miller et al. ................. 345/468
6,421,051 B1 * 7/2002 Kato ........................... 345/428
6,704,791 B1 * 3/2004 Harris ......................... 709/231

FOREIGN PATENT DOCUMENTS

| JP | 04-341081 | | 11/1992 |
|---|---|---|---|
| JP | 05-165931 | | 7/1993 |
| JP | 9-98428 | A | 4/1997 |
| JP | 10-275244 | A | 10/1998 |
| JP | 11-225168 | A | 8/1999 |
| JP | 11-296157 | A | 10/1999 |
| JP | 2000-82155 | A | 3/2000 |
| JP | 2001-6001 | A | 1/2001 |

* cited by examiner

*Primary Examiner*—Ulka Chauhan
*Assistant Examiner*—Jason M. Repko
(74) *Attorney, Agent, or Firm*—Birch, Stewart, Kolasch & Birch, LLP

(57) ABSTRACT

When reproducing animation data stored in a data storing section (11), a data evaluation section (21) evaluates the complexity of the animation data before reproducing the animation data, and judges whether or not an animation reproducing section (12) can reproduce the animation data without problem. When the data evaluation section (21) judges that, because of insufficient function or throughput, the animation reproducing section (12) cannot directly reproduce the evaluated animation data, the data evaluation section (21) does not allow the animation reproducing section (12) to reproduce the animation data, and instead notifies a user that the reproduction is not possible. With this, it is possible to prevent defects that animation in which data of some types are missing and animation having many missing frames are reproduced, even when animation reproducing terminals having a variety of throughputs reproduce animation data having various complexities.

27 Claims, 13 Drawing Sheets

FIG. 2

```
(text "hello"                          ⎤
    (POS (10, 40))                     |
    (direction right)                  |
    (font  helvetica)                  |  Es1
    (size 14)                          |
    (color (255, 255, 255))            |
)                                      ⎦

(triangle                              ⎤
    POS (62, 38) (86, 38 (74, 58))     |
    (line (color (0, 0, 255))          |  Ed2
          (width 2))                   |
    (fill (color (63, 0, 0)))          |
)                                      ⎦

(rectangle                                         ⎤
    (POS (10, 10) (70, 10) (70, 30) (10, 30))      |
    (line (color (255, 0, 0))                      |  Ed3
          (width 4)                                |
)                                                  ⎦

(sound                                 ⎤
    (file "bell.wav")                  |  Ea4
)                                      ⎦
```

KF (bracket label at top right)

| BEFORE CONVERSION | AFTER CONVERSION |
|---|---|
| (POS *) | (POS *) |
| (line (color *)) | (line (color (255,255,255))) |
| (width *) | |
| (fill *) | |
| (font *) | |
| (size *) | |
| (sound *) | |
| ⋮ | ⋮ |

FIG. 9

```
(text "hello"
    (POS (10, 40))                       ] Es1a      ⤹ KFa
    (direction right)
)

(triangle
    POS (62, 38) (86, 38 (74, 58))       ] Ed2a
    (line (color (255, 255, 255)))
)

(rectangle
    (POS (10, 10) (70, 10) (70, 30) (10, 30))  ] Ed3a
    (line (color (255, 255, 255)))
)
```

| DATA NUMBER : 4 0 0 | | | |
|---|---|---|---|
| UPPER LIMIT OF REFERENCE VALUE | DATA NAME | DATA NAME | |
| ∞ | 4 0 1 . d a t | 4 0 1 . s n d | ← A 1 |
| 1 0 0 0 | 4 0 2 . d a t | 4 0 1 . s n d | ← A 2 |
| 8 0 | 4 0 3 . d a t | | ← A 3 |

FIG. 17

| BEFORE CONVERSION | AFTER CONVERSION | CONDITIONS |
|---|---|---|
| (POS *) | (POS *) |  |
| (line (color *)) | (line (color (255, 255, 255))) | BW mode |
| (width *) |  |  |
| (fill *) |  | BW mode |
| (font *) |  |  |
| (size *) |  |  |
| (sound *) |  | sound off |
| ⋮ | ⋮ | ⋮ |

ANIMATION REPRODUCTION TERMINAL, ANIMATION REPRODUCING METHOD AND ITS PROGRAM

This application is the national phase under 35 U.S.C. § 371 of PCT International Application No. PCT/JP02/00810 which has an International filing date of Jan. 31, 2002, which designated the United States of America.

TECHNICAL FIELD

The present invention relates to an animation reproducing terminal, an animation reproducing method, and a program thereof which can prevent defects in animation where data of some types is missing and the animation is reproduced, even when animation reproducing terminals having a variety of throughputs reproduce animation data having various complexities.

BACKGROUND ART

In these years, portable terminal devices such as a cellular phone, a portable information terminal device, for example, have been widely used. In accordance with the development of communication networks and the more advanced functions of a terminal device itself, also has been used is a portable animation reproducing terminal capable of exchanging information intuitively and efficiently by reproducing video images and animation.

Here, as an animation reproducing method, Japanese Unexamined Patent Publication No. 275244/1998 (Tokukaihei 10-275244; published on Oct. 13, 1998) discloses a method to display animation by transmitting key frames and interpolating the key frames. Further, Japanese Unexamined Patent Publication No. 225168/1999 (Tokukaihei 11-225168; published on Aug. 17, 1999) discloses a method to dynamically change video and audio reproducing quality by sending and receiving information regarding a transmission method/transmission format in addition to transmission data when transmitting bit stream indicating moving images.

However, due to the need for portability, the throughput such as function/performance of a portable animation reproducing terminal is set lower compared with a general-purpose desktop computer, thereby causing that there inevitably exist various device types having various throughput. As a result, when different animation data require a variety of throughputs for reproduction, one animation reproducing terminal may be able to reproduce animation data, but another animation reproducing terminal may not be able to reproduce the animation data at a sufficient speed or may not be able to reproduce all of the animation data. Consequently, when such an animation reproducing terminal directly reproduces animation data, there is a problem that the intention of the creator may not be correctly conveyed.

In other words, a portable animation reproducing terminal is ideally desired to have (a) advanced functions such as high resolution display and multiple tone gradation color display, (b) high computing power, (c) capability of plotting graphics and characters at high speed, and (d) compact and lightweight with a long operating time. However, unlike a desktop computer, because of the need for portability, the portable animation reproducing terminal is difficult to satisfy all of those requirements of function, performance, dimensions, weight, and operating time. Accordingly, there are a wide variety of device types each having functions in accordance with its use. For example, for use whose main concern is the reduction of dimensions and weight, the device has limited functions.

As a result, when animation data is created and delivered in conformity to an animation reproducing terminal having advanced functions, it is likely that some animation reproducing terminals cannot reproduce the animation data at a sufficient speed due to an insufficient plotting and computing speed, for example, or cannot reproduce part of the animation data due to lack of function such as sound output, for example. Consequently, failure in outputting sound, frame missing, etc. may prevent the intensions of the creator from being correctly conveyed. On the other hand, when animation data is created in conformity to a low-function terminal and delivered, its expressiveness becomes poor.

Further, Japanese Unexamined Patent Publication No. 296157/1999 (Tokukaihei 11-296157; published on Oct. 29, 1999) discloses a technique to ensure real time animation by not performing plotting of the graphics that was not plotted within an allotted time to reproduce one scene, when displaying animation. Further, the Publication also discloses a technique to display by priority the graphics whose plotting is indispensable, in such a manner that the graphics that were not plotted in a scene whose plotting was interrupted are plotted by priority in its subsequent scene or that different graphics are given different priority of plotting in each scene.

However, with the technique disclosed in the Publication, the animation displayed by interrupting plotting differs from the original content of the animation. Further, the technique assumes a case where a frame rate is high. Thus, the effects are small in a case where a frame rate is low and a frame rate varies in response to the throughput of a reproducing device as in the animation method described in Tokukaihei 10-275244.

In view of the foregoing problems, the present invention has an objective to provide an animation reproducing terminal, a method for reproducing animation, and a program for realizing the animation reproducing terminal causing that, even when animation reproducing terminals having a variety of throughputs reproduce animation data having various complexities, (A) an animation reproducing terminal having sufficient throughput directly reproduces the animation data, while (B) an animation reproducing terminal having insufficient throughput can prevent defects that animation in which data of some types are missing and animation having many missing frames are reproduced.

SUMMARY OF THE INVENTION

In order to solve the foregoing problems, an animation reproducing terminal of the present invention that includes an animation reproducing section for reproducing animation data which express each frame of animation in a combination of a plurality of element graphics is characterized by including a data evaluation section for evaluating complexity of animation data based on the number of element graphics contained in a frame of the animation data, before the animation reproducing section reproduces the animation data, the animation reproducing terminal judging whether or not the animation reproducing section is able to directly reproduce the animation data based on an evaluation result of the evaluation section, and for carrying out a predetermined processing when the reproducing section is not able to directly reproduce the animation data, the predetermined processing being for a case where the reproducing section has an insufficient ability.

With this arrangement, the data evaluation section evaluates the complexity of animation data based on the number of element graphics contained in a frame of the animation data. With this, the animation reproducing terminal judges whether or not the animation reproducing section can directly reproduce the animation data based on an evaluation result of the data evaluation section. When the animation reproducing section cannot directly reproduce the animation data, the animation reproducing terminal can carry out a predetermined processing prepared for a case where the reproducing section has an insufficient ability. For example, the animation reproducing terminal may notify the user of the incapability of reproduction, convert the animation data into animation data reproducible by the animation reproducing section, or, when the animation data is sent from a server, request the server to resend animation data in a format reproducible by the animation reproducing section. On the other hand, when the animation reproducing section has throughput enough for reproducing the animation data, the animation reproducing terminal allows the animation reproducing section to reproduce the animation data.

With this arrangement, the complexity of each animation data to be reproduced by the animation reproducing section is evaluated based on the number of element graphics contained in the animation data, and whether or not the animation reproducing section can directly reproduce the animation data is judged based on the judgment result. Thus, this judgment requires a computing amount smaller than in a case where the animation data is actually reproduced.

Further, the complexity of animation data is evaluated before the animation reproducing section reproduces the animation data, and when the animation data cannot be directly reproduced, a predetermined processing is carried out. This prevents an animation reproducing terminal having insufficient throughput from directly reproducing the animation data.

As a result, with a small computing amount, it is possible to prevent defects such that animation having many missing frames is reproduced when an animation reproducing terminal having insufficient throughput tries to reproduce too complicated animation data for the throughput; and such that the intention of animation cannot be conveyed when an animation reproducing terminal incapable of outputting sound tries to reproduce animation data containing sound.

Namely, with the animation reproducing terminal, a throughput required for reproducing animation is preestimated so that, when the animation data is judged as irreproducible, it is possible to stop reproducing the animation data; it is possible to simplify the animation data into a reproducible form; and it is possible to request simplified animation data to be resent. This can prevent unintended degradation of animation quality.

For a fuller understanding of the nature and advantages of the invention, reference should be made to the ensuing detailed description taken in conjunction with the accompanying drawings.

BRIEF DESCRIPTION OF THE DRAWINGS

FIG. 2 is an explanatory diagram showing an example of animation data reproduced by the animation reproducing terminal;

FIG. 9 is an explanatory diagram showing an example of animation data after conversion;

FIG. 17 is an explanatory diagram showing conversion rules which are referred to by the animation reproducing terminal when converting animation data.

DETAILED DESCRIPTION

FIRST EMBODIMENT

Figure 1:
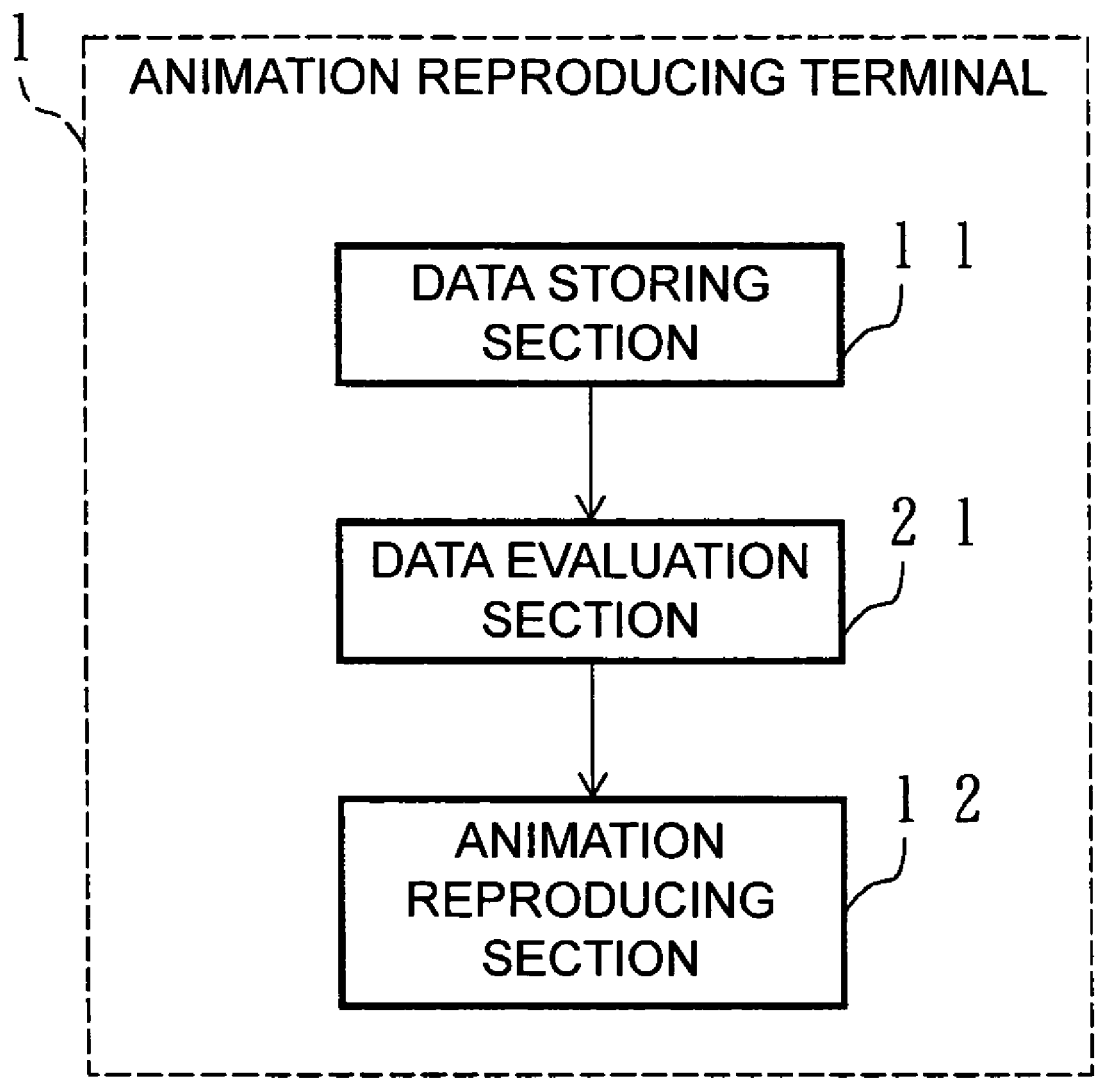
FIG. 1 in accordance with an embodiment of the present invention is a block diagram showing chief members of an arrangement of an animation reproducing terminal.

The following will explain an embodiment of the present invention with reference to FIGS. 1 through 6. Namely, an animation reproducing terminal 1 in accordance with the present embodiment is a device suitably used for a portable terminal such as a cellular phone and a portable information terminal device, for example. As shown in FIG. 1, the animation reproducing terminal 1 is provided with a data storing section 11 for storing animation data indicating animation which is delivered via a recording medium, communication, and other means, and an animation reproducing section (reproducing means) 12 for reproducing the animation data.

The following will explain a case where the animation reproducing section 12 reproduces animation data in a key frame format as an example of animation data. Animation data A includes one or more ordered key frame data KF, as described in Tokukaihei 10-275244, for example. Each key frame data KF indicates a key frame among frames that constitute animation. Frames between the key frames are created based on the key frame data KF by the animation reproducing section 12.

The key frame data KF includes one or more graphic data Ed corresponding to a graphic Id (see FIG. 3) that constitutes the key frame, such as a polygon, closed curve, segment, curve, or circle, as shown in FIG. 2, for example. Further, the key frame data KF may include character string data Es indicating a character and sound data Ed indicating sound.

Further, the animation data A may contain time information indicating a time between key frames, relation of correspondence among graphics and character strings in each key frame, and the like, so as to reproduce animation by interpolation between a plurality of key frames.

When reproducing the animation data A, the animation reproducing section 12 sequentially extracts the key frame data KF, and interpolates the key frame data KF if necessary. Further, after extracting the graphic data Ed and the character data Es of the key frame from each interpolated or extracted frame data F, the animation reproducing section 12 combines the graphic Id and a character Is, which are respectively indicated by the graphic data Ed and the character data Es, so as to form one frame. The frame can be displayed on a screen, as shown in FIGS. 3, 4, and 5, for example.

Figure 3:
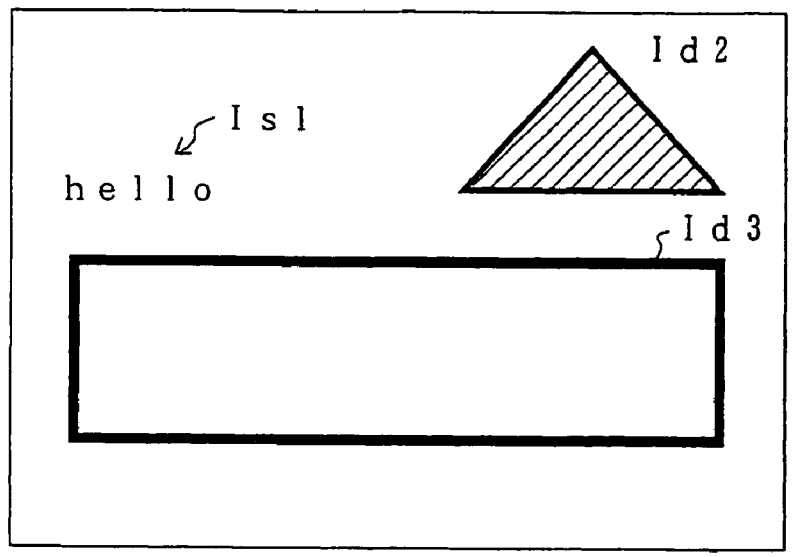
FIG. 3 is an explanatory diagram showing an example of a key frame reproduced based on the animation data.
Figure 4:
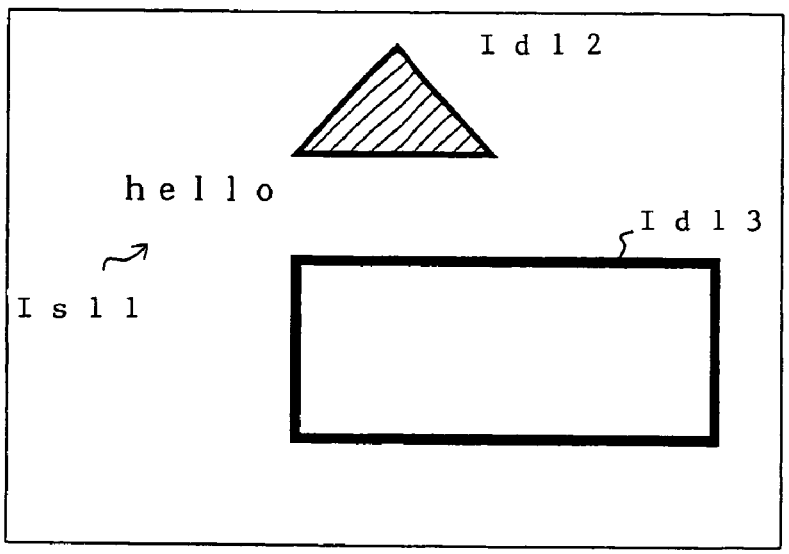
FIG. 4 is an explanatory diagram showing an example of a frame reproduced based on the animation data.
Figure 5:
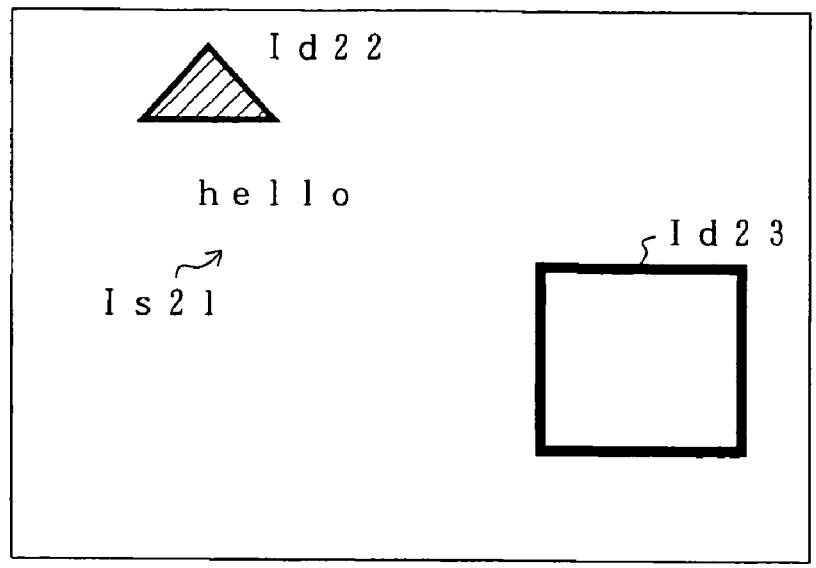
FIG. 5 is an explanatory diagram showing another example of a key frame reproduced based on the animation data.

Here, FIGS. 3 and 5 show key frames created from the key frame data KF, as detailed later, and FIG. 4 shows a frame created by interpolating both the key frames.

The above frames are sequentially displayed, thereby displaying moving animation. Further, when the key frame data KF includes sound data Ea, the animation reproducing section 12 can reproduce the sound of a file indicated by the sound data Ea, in synchronism with the key frames.

Further, the animation reproducing terminal 1 in accordance with the present embodiment is provided with a data evaluation section 21 for evaluating the complexity of the animation data A before the animation reproducing section 12 reproduces the animation data. The data evaluation section 21 evaluates the animation data A, estimates a throughput required for the animation reproducing section 12 to reproduce the animation data A, and judges whether the animation reproducing section 12 has throughput sufficient for reproducing the animation data A. Note that the data evaluation section 21 corresponds to data evaluation means and control means as recited in the claims.

Specifically, the data evaluation section 21 in accordance with the present embodiment extracts different types of data, such as the graphic data Ed, character data Es, and sound data Ea, for example, from the animation data A, and estimates their throughputs required for reproduction using methods corresponding to respective types. Then, the data evaluation section 21 sums the throughputs after multiplying weighing factors predetermined for respective data types, so as to calculate an overall evaluation value of the animation data A.

More specifically, when calculating a throughput of the graphic Id, the data evaluation section 21 in accordance with the present embodiment extracts the graphic data Ed from each key frame of the animation data A, and sums the number of vertices of the graphic Id that is plotted based on the graphic data Ed.

Here, though there are various types of graphics, when the animation reproducing section 12 plots the graphics Ed, a throughput required for plotting the graphic data Ed depends on the numbers of vertices and sides that constitute each graphic Id, and an area to be painted. Further, when the key frames are interpolated, a throughput required for the interpolation depends on the number of vertices that constitute each graphic Id. Here, the number of sides is roughly determined by the number of vertices. Therefore, by estimating a throughput required for plotting the graphic Ed based on the number of vertices, it is possible to roughly estimate the throughput required for plotting the graphic Ed, while requiring a computing amount much smaller than in a case where the estimation is based on the numbers of vertices and sides, and the painting area altogether.

The relation between a throughput required for interpolation and the number of vertices will be explained in further detail. When the key frames are interpolated, the coordinates of vertices that constitute each graphic in a frame created by the interpolation are contained in both precedent and subsequent key frames of the created frame, and calculated by interpolating the coordinates of vertices of each corresponding graphic in both the key frames. The following will explain linear interpolation as an example. Where a time between an (n−1)th key frame and an nth key frame is t0 second, and a vertex having an x-y coordinate (x[n−1], y[n−1]) in the (n−1)th key frame corresponds to a vertex having an x-y coordinate (x[n], y[n]) in the nth key frame, an x-y coordinate (x[m], y[n]) corresponding to both the vertices in a frame t second after the (n−1)th key frame is expressed as follows.

$$x[m] = \{x[n-1] \cdot (t0-t) + x[n] \cdot t\}/t0$$

$$y[m] = \{y[n-1] \cdot (t0-t) + y[n] \cdot t\}/t0$$

Further, in interpolating methods other than the linear interpolation, the coordinates of vertices in a frame created by the interpolation are also calculated from the coordinates of corresponding vertices. Namely, a throughput required for creating the frame depends on the number of corresponding vertices.

Further, as for character strings, a throughput for the animation reproducing section 12 to reproduce characters depends on the number of characters. Accordingly, the data evaluation section 21 also extracts the character data Es from each key frame that constitutes the animation data, and sums the number of characters in the character strings that is displayed based on the character data Es.

Further, the data evaluation section 21 prestores values corresponding to throughputs for each file format that stores sound. When a storing sound file is identified based on the sound data Ed contained in the animation data, the data evaluation section 21 acquires a value corresponding to a format for storing sound. Here, the formats for storing sound into a file include various formats such as wave format and MP3 (Mpeg1 Layer3) format, for example. Data compression format such as the MP3 format, for example, requires processing for data expansion upon reproduction. A throughput for this processing depends on the formats, and thus can be estimated by the formats.

Further, values corresponding to the sum of vertices, the sum of the number of characters, and the sound format are added together after respectively multiplied by predetermined weighing factors, and a throughput required for reproducing the animation data is estimated. Then, the estimated throughput, as a value indicating the throughput of the animation reproducing section 12, is compared with a preset reference value. When the estimated throughput exceeds the reference value, the data evaluation section 21 judges that the throughput of the animation reproducing section 12 is insufficient to reproduce the animation data A.

For example, the key frame shown in FIG. 3 includes graphics Is1, Id2, and Id3, and is reproduced together with a sound file in the wave format, as described later. Namely, the number of vertices is seven, the number of characters is five, and the sound file format is the wave format. Further, in the data evaluation section 21 in accordance with the present embodiment, the weighing factor for vertex is set to 1, the weighing factor for the number of characters is set to 5, and the weighing factor for the sound file in the wave format is 100. The reference value of the data evaluation section 21 is set to 100.

Namely, the data evaluation section 21 estimates the complexity of the key frame, namely, a throughput required for reproduction to be 7×1+5×5+1×100=132. This value is larger than 100, and thus the animation data is judged as irreproducible.

Note that the weighing factors represent a ratio of throughputs required for processing for each of the different data types contained in the animation data A, and differ from one animation reproducing terminals 1 (animation reproducing sections 12) to another.

For example, in an arrangement wherein the animation reproducing section 12 prestores characters as bit map data and directly plots the bit map data per character when plotting, a throughput required for displaying characters is smaller compared with an arrangement wherein the animation reproducing section 12 stores characters as outline data and expands the outline data into bit map data when plotting. Thus, the arrangement in which the animation reproducing section 12 stores bit map data has a weighing factor set smaller than in an arrangement to store outline data. Further, in an animation reproducing section 12 including special hardware for sound reproduction such as a circuit for reproducing (expanding) sound that is stored in a particular format, and a sound generating circuit, the weighing factor for the sound data Ea is set lower than in an arrangement without special hardware where computing means such as a CPU executes a program to reproduce sound.

Figure 6:
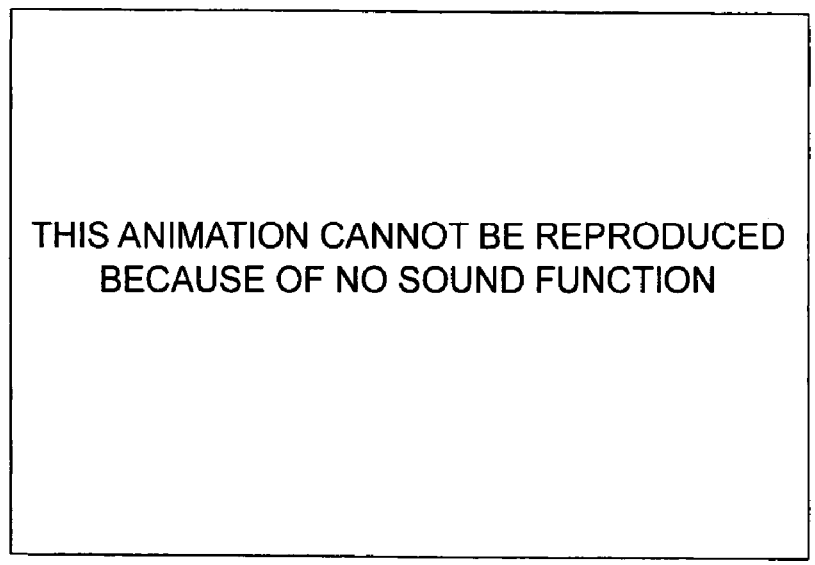
FIG. 6 is an explanatory diagram showing an example of a screen of the animation reproducing terminal where the incapability of reproduction is notified.

Based on the evaluation result, the data evaluation section 21 judges that the animation reproducing section 12 cannot directly reproduce the animation data A, when the animation data A contains data whose type cannot be reproduced by the animation reproducing section 12, or when the animation reproducing section 12 does not have sufficient ability to reproduce the data even though the data type can be reproduced by the animation reproducing section 12, for example. In this case, the data evaluation section 21 notifies the user of the incapability of direct reproduction by showing display on the screen of the animation reproducing terminal 1, as shown in FIG. 6, for example.

On the other hand, as a result of the evaluation of animation data, if the data evaluation section 21 judges that the animation reproducing section 12 has sufficient ability to reproduce the animation data, the data evaluation section 21 allows the animation reproducing section 12 to reproduce the animation data.

Here, in an arrangement to start reproducing any animation data A without evaluating the complexity of the animation data A, as in the conventional technique, the animation reproducing section tries to reproduce the animation data A including sound, even when the animation reproducing section cannot reproduce sound data, for example. As a result, the animation reproducing section reproduces the animation without sound. This may prevent the user from perceiving the intention of the creator.

Further, in the conventional technique, the animation reproducing section may try to reproduce the animation data A, the reproduction exceeding the throughput of the animation reproducing section. In this case, due to the insufficient throughput of the animation reproducing section 12, the animation reproducing section 12 cannot reproduce the animation at an original frame rate as intended by the creator, thereby causing that frames are frequently missing.

Here, if the frame missing occurs with the same frequency from beginning to end, the user may give an instruction to stop reproducing when seeing a first portion of the animation, and use a different animation reproducing terminal having higher throughput to reproduce the animation. With this, the animation can be reproduced as intended by the creator, even though this entails some complication.

However, when the frame missing occurs in the middle of the animation, the user completely has seen a portion of the animation before the frame missing occurs, and, albeit incompletely, sees the portion where the frame missing occurs. Thus, even when a different animation reproducing terminal is used to reproduce the animation again, the animation thus seen again may give a different impression from the animation when seen on the different animation reproducing terminal from the beginning. In particular, as for animation that is highly unpredictable and aims to give a strong impact, impressions in both the cases widely differ.

In contrast, in the animation reproducing terminal 1 shown in FIG. 1, before the animation reproducing section 12 reproduces animation data, the data evaluation section 21 evaluates the complexity of each animation data A, judges whether the animation reproducing section 12 can reproduce the animation data A without problems, and notifies the user that the animation reproducing section 12 cannot reproduce the animation data A if that is the case. This can prevent such defects as to reproduce animation having many missing frames and lacks data of some types, such as sound, for example. As a result, it is possible to realize the animation reproducing terminal 1 that can correctly convey the intention of the creator of the animation to users.

Note that FIG. 4 explains a case where lack of a sound reproducing function is notified when the animation reproducing section 12 without the sound reproducing function tries to reproduce the animation data A. When the animation reproducing section 12 cannot reproduce the animation data A because of its insufficient throughput, this reason is displayed. In this case, the data evaluation section 21 in accordance with the present embodiment calculates an valuation value for each data type contained in the animation data A, and sums the evaluation values after respectively multiplying the weighing factors, thereby evaluating the complexity of the animation data A. Thus, the data evaluation section 21 may judge the reason why the animation reproducing section 12 cannot reproduce the animation data A by referring to the evaluation value for each data type, and display the reason thus judged.

For example, where the reference value is 100, and evaluation values of the graphic data Ed, character data Es, and sound data Ea after multiplied by the weighing factors are 7, 25, and 100 respectively, as in the example as described above, the data evaluation section 21 can judge that the reproduction is not possible because the evaluation value with respect to the sound data Ea is large, and can notify the user that the reproduction is not possible because of the sound.

Note that, for convenience, the above explanation dealt with a case where a simple animation data A such as the animation data A containing one character data Es, two graphic data Ed and sound data Ea may or may not be reproduced by the animation reproducing section 12 having a certain level of throughput, as an example of throughput that the animation reproducing section 12 has. In this example, the sound data much contributes to the evaluation value. However, actually, the animation reproducing section 12 can reproduce a little more complicated animation data A, and thus the sound data contributes less to the evaluation value.

Further, in the above explanation, when the data evaluation section 21 evaluates the animation data A, the data evaluation section 21 evaluates graphics based on the number of vertices by assuming the vertices that constitute the graphic data Ed contained in a frame as element graphics, but the method to evaluate graphics is not limited to this. For example, the complexity of the animation data A may be evaluated based on the number of the graphics Id themselves, or the number of edges that define the graphics Id, as the element graphics. Note that a throughput required for plotting the graphics Id varies in accordance with the number of vertices and edges. Furthermore, the number of edges depends on the number of vertices. Thus, by evaluating the complexity of the animation data A based on the number of vertices, the computing amount can be reduced without significantly lowering the accuracy.

Further, in the key frame format, the contribution of the number of vertices to the computing amount required for reproduction is larger than that in the frame format. Thus, by employing vertices as the element graphics, it is possible to evaluate the complexity of the animation data A accurately with a smaller computing amount.

Note that, the data evaluation section 21 may evaluate not only the number of element graphics, but also the plotting method of the element graphics, including, for example, whether the polygon is painted or not and whether the segment is a broken line or not. In this case, only by adding a computing amount drastically smaller than a computing amount for actual plotting, such as the judgment on whether or not the polygon is painted and the judgment on line types, the difficulty for plotting the element graphics can be evaluated. Namely, it is possible to evaluate the complexity of the animation data A more accurately than calculating the complexity only by the number of element graphics.

Further, the above explanation dealt with a case where the animation reproducing section 12 reproduces the animation data A in the key frame format, but the method is not limited to this. The present invention can be applied to a case where the animation reproducing section 12 reproduces animation by consecutively switching a plurality of bitmap images to display. Further, as an example of an animation transmission method using bitmap images, data compression that utilizes similarity among bitmap images that constitute animation, such as MPEG (Moving Picture Expert Group) and QUICK-TIME (Trademark), for example, can be applied to a case for reducing an amount of data.

Note that, when the animation data A is animation data in the frame format, wherein predetermined instructions for plotting graphics and characters or for reproducing sound are combined to form frames in the animation, the number and content of the instructions significantly vary the throughput that the animation reproducing section 12 requires for reproduction. As a result, in animation in the frame format or the key frame format, even when frame missing does not occur in the beginning, frame missing may frequently occur in the middle of the animation. Further, in the animation in the frame format, as described above, by evaluating the throughput based on the number of vertices of the graphics, it is possible to roughly calculate a throughput required for reproduction with high accuracy, while requiring a computing amount drastically smaller than the computing amount when additionally evaluating the computing amount required for reproduction and a painting area. Thus, when applied to a case where the animation reproducing section 12 reproduces animation in the frame format, especially a great effect is obtainable.

Further, when the animation data A is in the key frame format, the animation reproducing section 12 needs to interpolate frames between key frames based on the respective key frames. Here, a throughput required for the interpolation widely increases or decreases depending on the number and content of the instructions. Thus, when applied to a case where the animation reproducing section 12 reproduces animation in the key frame format, especially a great effect is obtainable.

The following will explain in detail a data structure of the animation data A in the key frame format, which is reproduced in the present embodiment, and the operation of the animation reproducing section 12 when reproducing the animation data A.

Namely, the graphic data Ed contained in the animation data A includes information for plotting each of the graphics that constitute the key frame. For example, this information includes shape information indicating the shape of the graphic to be plotted, such as a straight line, curved line, and circle; position information indicating the position (range) of the graphic to be plotted, such as the position, size, and rotation angle of the graphic; color information indicating the color of the graphic; and line information indicating the line width and line type (broken line, dotted line, etc.) that express the graphic. The character data Es contains information for displaying a character in the key frame, including content information indicating the content of a character string, font information indicating a font for display; position information indicating the position (range) of the character, such as the position, size, and rotation angle of the character; and color information of the character, for example. Further, the sound data Ea contains a file name of a sound file, for example.

For example, the key frame data KF for plotting the key frame that contains the character string Is1, a triangle graphic Id2, and a rectangle graphic Id3, as shown in FIG. 3, includes respectively corresponding character data Es1, graphic data Ed2 and Ed3. Further, the key frame data KF also includes sound data Ea4.

The character data Es1 is a command "(text "hello" . . . )" indicating character string data and indicating the content of the character string (hello). The command includes an element indicating a display position "(POS . . . )", an element indicating a direction of the character string "(direction . . . )", an element indicating a font "(font . . . )", an element indicating the size of the character string "(size . . . )", and an element indicating the color of the character string "(color . . . )". The display position is specified by the origin coordinate of the character string, and the color is specified by the combination of a red component value, a green component value, and a blue component value.

The graphic data Ed2 indicating the triangle graphic Id2 is a command "(triangle . . . )" indicating the plotting of a triangle. This command includes an element indicating a display position "(POS . . . )", an element indicating a method to plot the sides "(line . . . )", and an element indicating a method to plot inside the triangle "(fill . . . )". The display position is specified by the coordinates of the respective vertices. The method to plot the sides are specified by an element indicating the line width "(width . . . )" in addition to the color as in the character. On the other hand, in the example of FIG. 2, the method to plot the inside is specified by the color as in the character. Likewise, the graphic data Ed3 indicating the rectangle graphic Id3 is a command "(rectangle . . . )" indicating the plotting of a rectangle, and includes elements similar to the triangle. Note that, the graphic data Ed3 does not include an element indicating the inside, but in this case, the animation reproducing section 12 processes the inside as in a case where a predetermined stipulated value (default value) is specified.

The sound data Ea4 is a command indicating the reproduction of sound "(sound . . . )", and includes an element indicating the entity of the sound data "(file . . . )". In the present embodiment, the entity of the sound data is specified by a file name of the file that stores required data for reproducing the sound. Note that, in FIG. 2, data Es1 through Es4 are described as the character strings that include elements and commands, but data Es1 through Es4 may be binary data as long as the data can identify the respective elements and the respective commands. Further, the above explanation dealt with a case where the entity of the sound data is in a different file as an example, but the entity may be contained in the key frame data KF.

The key frame data KF includes instructions for advanced expression of graphics and characters, such as a variety of color specifications, line widths, or font types, and instructions for sound reproduction. It is thus assumed here that the key frame data KF is reproduced by an animation reproducing section 12 having advanced functions, namely an animation reproducing section 12 having high throughput for plotting graphics and characters, functions for high-resolution display and multiple tone gradation color display, and a sound reproducing function.

When the animation reproducing section 12 extracts the key frame data KF shown in FIG. 2 from the animation data A, the animation reproducing section 12 displays the key frame of FIG. 3 including the character Is1 and the graphics Id2 and Id3, and reproduces the sound indicated by the sound data Ea4, based on the data Es1 through Es4.

Further, if a key frame subsequent to the key frame is specified to be as shown in FIG. 5 by another key frame data in the animation data A, the animation reproducing section 12 creates an intermediate frame as shown in FIG. 4, based on both the key frame data. Note that, when plotting key frames and frames, the coordinates indicated by key frame data may be converted into the coordinates in conformity to the display screen of the animation reproducing terminal 1 if necessary.

Specifically, based on command types, the appearance order of the commands, or other data (not shown) in the key frame data, the animation reproducing section 12 judges that the character Is1 corresponds to a character Is11, and the graphics Id2 and Id3 correspond to graphics Id12 and Id13, respectively. Thus, when linearly interpolating one frame, the animation reproducing section 12 displays a character Is21 in the middle position of the character Is1 and Is11, as shown in FIG. 4. A triangle graphics Id22 is displayed in the middle position and size of the graphics Id2 and Id12. A rectangle graphics Id23 is displayed in the middle position and size of the graphics Id3 and Id13. Note that, their sizes and positions can be acquired by referring to data contained in the key frame data (for example, Es1 through Ed3). Further, this explanation dealt with a case of linear interpolation, namely equal division, as an example, but the interpolation may be carried out by other methods such as non-linear interpolation using a predetermined function as long as a desired number of frames can be created from the key frame data.

With this, when the animation reproducing section 12 can directly reproduce the animation data A, the animation reproducing section 12 can reproduce animation smoothly in synchronism with sound by appropriately interpolating the key frame data KF.

On the other hand, when the complexity of the animation data A exceeds the throughput of the animation reproducing section 12, or when the animation data A contains data that cannot be reproduced by the animation reproducing section 12, the evaluation which is made before reproduction by the data evaluation 21 as described above prevents the animation reproducing section 12 from reproducing the animation data A. This prevents inappropriate animation reproduction beforehand.

SECOND EMBODIMENT

Incidentally, in the animation reproducing terminal 1 in accordance with First Embodiment, when the data evaluation section 21 judges that the animation reproducing section 12 cannot directly reproduce the animation data A, the data evaluation section 21 does not instruct the animation reproducing section 12 to reproduce the animation data A, and instead notifies the user that the reproduction is not possible.

On the other hand, the present embodiment will explain a case in which, when the data evaluation section 21 judges that the animation reproducing section 12 cannot directly reproduce the animation data A, the animation data A is simplified to such a degree as to be reproducible by the animation reproducing section 12.

Figures 7, 8:
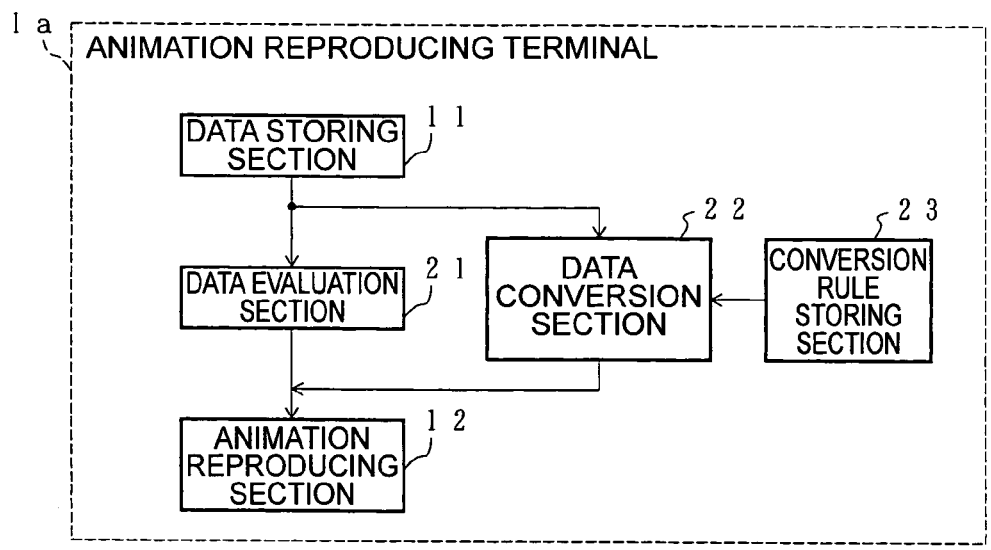
FIG. 7 in accordance with another embodiment of the present invention is a block diagram showing chief members of an arrangement of an animation reproducing terminal.
FIG. 8 is an explanatory diagram showing conversion rules which are referred to by the animation reproducing terminal when converting animation data.

Namely, as shown in FIG. 7, an animation reproducing terminal 1a in accordance with the present embodiment is provided with a data conversion section (control means) 22 for converting the animation data A, in addition to the arrangement of FIG. 1. When the judgment of the data evaluation section 21 is irreproducible, the data conversion section 22 simplifies the animation data A such a degree as to be reproducible by the animation reproducing section 12, based on conversion rules prestored in a conversion rule storing section 23.

With this, in the animation data A, the data that cannot be reproduced by the animation reproducing section 12 is deleted or is converted into a reproducible format. Further, the data is simplified if the data is so complicated that the throughput of the animation reproducing section 12 cannot display the animation. As a result, the animation reproducing section 12 that cannot directly reproduce the animation data A can reproduce the animation data A to the extent possible.

In this case, before the animation data A is reproduced, the data evaluation section 21 also evaluates the complexity of the animation data A. Thus, as in First Embodiment, it is possible to prevent the problem of animation reproduction with many frames being missing, which is caused by directly reproducing the animation data A.

The following will explain in detail conversion operations, in a case where animation data that contains (i) the graphic data Ed2 and Ed3 whose line widths are specified and (ii) the sound data Ea4 is reproduced by an animation reproducing section 12 which is only capable of displaying monochrome two tone gradations in low resolution without a sound reproducing function.

Namely, as shown in FIG. 8, the conversion rule storing section 23 stores conversion rules in a table form that lists combinations of patterns before conversion and after conversion. Here, in FIG. 8, "*" in the column of the patterns before conversion indicates that "*" matches any character string, and "*" in the column of the patterns after conversion indicates that the pattern before conversion remains unconverted.

For example, the first row of the conversion table shown in FIG. 8 indicates that the position information is not converted at all, and the second row indicates that the line color is compulsorily converted into a particular color (in this case, white indicated by "255, 255, 255"), irrespective of any original line color except black. The third through seventh rows are blank in the columns of the patterns that have been subject to conversion. This indicates that line width, inside painting, character font and size, and sound are deleted irrespective of the description which has been made before conversion.

When instructed to convert the animation data A, the data conversion section 22, which stores the conversion table, finds a portion corresponding to (matching) the pattern which has not yet been subject to conversion from each key frame data KF in the animation data A, and replaces that portion with the pattern which has been subject to conversion. Thus, the key frame data KF shown in FIG. 2 is converted into key frame data KFa shown in FIG. 9.

Figure 10:
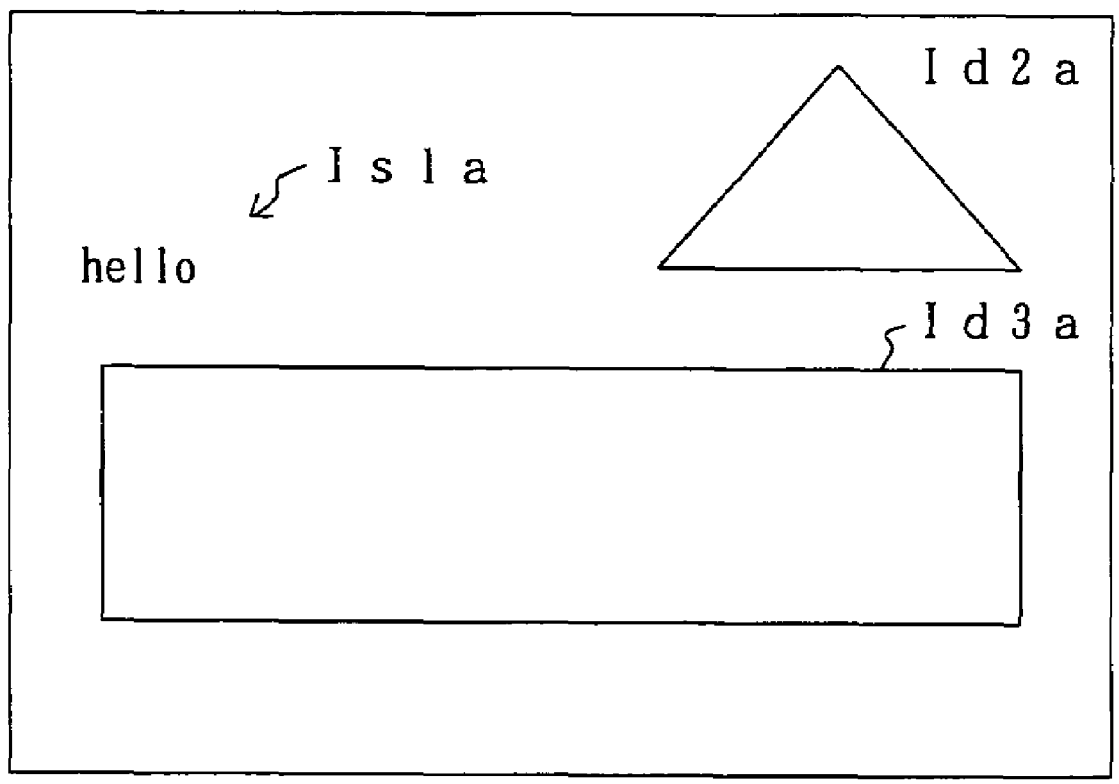
FIG. 10 is an explanatory diagram showing an example of a key frame reproduced based on the animation data.

Here, in the key frame data KFa that has been subject to conversion, the color of the graphics (characters) is made into a binary (monochrome) in accordance with the ability of the animation reproducing section 12 to display monochrome two tone gradations, and the sides (lines) are converted to "(255, 255, 255)" (Ed2$a$, Ed3$a$) indicating white, no matter what the original color is. Further, the element regarding the method to plot the inside "(fill . . . )", such as painting color information (attribute), is deleted so as not to paint the graphics. Further, the element indicating the side width of the graphics "(width . . . )" is deleted in accordance with the display ability in low resolution, and thus the sides are plotted in a predetermined width, no matter how wide the original width is. Likewise, the attributes indicating character font and size are omitted in accordance with only one font type, and thus the characters are displayed in predetermined font and size (Es1$a$). Further, the sound data Ea4 shown in FIG. 2 is omitted from the key frame data KFa in accordance with the animation reproducing section 12 of the present embodiment without a sound reproducing function. With this, when displaying the key frame data KFa after conversion, displayed is a key frame composed of the graphics (character) Is1$a$ through Id31 which are reproducible by the animation reproducing section 12, as shown in FIG. 10.

Incidentally, the above explanation dealt with the case where the data conversion section 22 finds a character string that matches the pattern that has not been subject to conversion from the key frame data KF, and replaces the character string with the pattern that has been subject to conversion. With this converting method, the processing such as pattern collation and character string replacement, which requires a comparatively smaller computing amount, can delete the data, command, or element that the animation reproducing section 12 does not have. Further, the pattern collation and character string replacement also can convert the data, command, or element into a predetermined value.

Therefore, when the animation data A contains the data that cannot be reproduced by the animation reproducing section 12, or when, even though the data is of type that can be reproduced, the key frame data KF partly contains an irreproducible command or element, it is possible to surely detect such cases with a small computing amount, and can delete the data, command, or element or can convert the data, command, or element into those reproducible by the animation reproducing section 12.

On the other hand, as another conversion method, the following will explain a case where, when the data conversion section 22 approximates the graphics having a complicated shape in the animation data A by graphics having a shape which can be plotted with low throughput, the approximation accuracy is adjusted in accordance with the throughput of the animation reproducing section 12.

A case where a curve is approximated by segments will be explained as an example of the approximation. When the data evaluation section 21 judges that the animation reproducing section 12 cannot directly reproduce the animation data A because the key frame data KF in the animation data A contains a curve, the data conversion section 22 approximates the curve by a plurality of segments.

In this case, accurate approximation using many segments produces a graphic similar to the original curve, but increases a throughput for plotting. On the other hand, approximation using a small number of segments can reduce a throughput required for plotting, but lowers its accuracy, and a displayed graphic has a shape quite different from the original curve.

In the present variation, in order to express the original graphic as precise as possible, the data evaluation section 21 evaluates the animation data to estimate its throughput for plotting, and adjusts the approximation accuracy of the data conversion section 22 in conformity to the throughput of the animation reproducing section 12.

For example, when a key frame data KF is composed of graphic data Ed indicating ten curves, a curve approximated by segments has 21 vertices, where an initial value of the number of segments for approximating a curve is 20. Thus, in the case of the above-described evaluation method, the data evaluation section 21 evaluates that the evaluation value of the key frame data KF is 210 in the accuracy of the initial value. Since the reference value indicating the throughput of the animation reproducing section 12 is 100, as described above, the data evaluation section 21 estimates that, with this accuracy, the throughput is insufficient to display animation at a sufficient speed. Accordingly, the data evaluation section 21 lowers the accuracy for approximating a curve so that the evaluation value falls within the reference value.

When it is assumed that the number of segments approximating a curve is n, a curve approximated with the segments has (n+1) vertices, and thus the evaluation value of a key frame that contains the graphic data Ed including 10 curves is 10(n+1). Therefore, the data evaluation section 21 derives $n \leq 9$ from $10(n+1) \leq 100$, and instructs the data conversion section 22 to approximate a curve by nine segments.

With this, the animation data A can be approximated as accurately as possible to the extent that the animation reproducing section 12 can reproduce, and thus the animation reproducing section 12 can reproduce animation data Aa that has been subject to conversion at a sufficient speed.

Further, as another conversion method, the data conversion section 22 may convert the animation data A so as to delete the graphics whose actual display size is small. In this case, by comparing the display size with a predetermined value, for example, deleted are the graphics that are too small to be recognized by the user even when the graphics are plotted. With this, it is possible to reduce the throughput required for reproduction without decreasing the ability of the animation reproducing section 12 to express animation.

Further, as a further conversion method, the data conversion section 22 may expand, in advance, compressed sound data as in the MP3 format, thereby reducing a throughput for reproduction.

With any of the conversion methods, the data evaluation section 21 evaluates the complexity of the animation data A before reproducing the animation; and when it is judged by the data evaluation section 21 that the animation data A cannot be directly reproduced, the data conversion section 22 converts the animation data A into a format reproducible even by the animation reproducing section 12. Thus, as in First Embodiment, it is possible to prevent the problem of animation reproduction with many missing frames that is caused by directly reproducing the animation data A.

THIRD EMBODIMENT

Incidentally, Second Embodiment explained the case where the animation reproducing terminal 1 is provided with the data conversion section 22 and converts the animation data A so as to create the animation data Aa reproducible by the animation reproducing section 12.

On the other hand, the present embodiment will explain a case where, when the data evaluation section 21 judges that the animation reproducing section 12 cannot directly reproduce the animation data A, the animation reproducing terminal 1 requests a server device, which delivers the animation data A, to resend animation data Ab reproducible with lower throughput compared with the initial animation data A.

Figure 11:
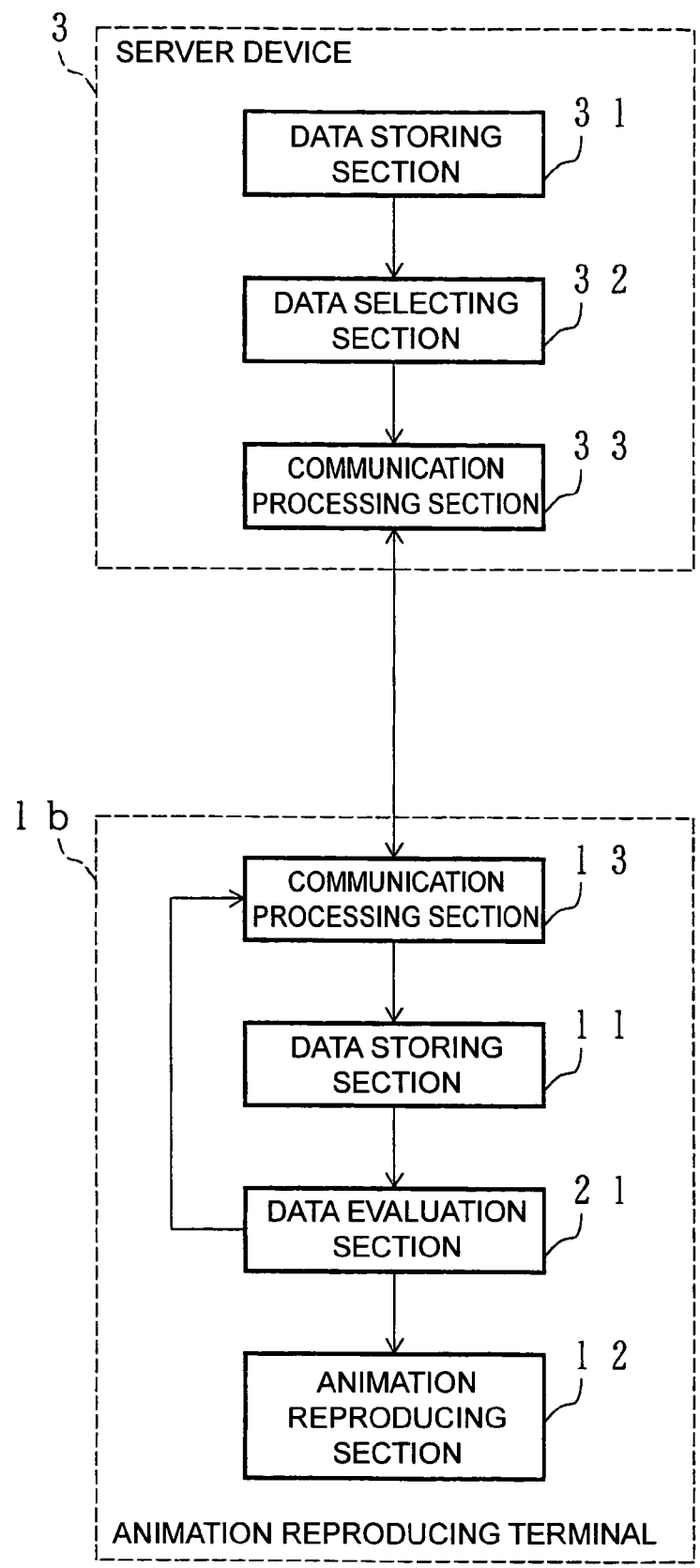
FIG. 11 in accordance with a further embodiment of the present invention is a block diagram showing chief members of arrangements of an animation reproducing terminal and a server device.

Namely, as shown in FIG. 11, a system in accordance with the present embodiment is provided with a server device (delivering device) 3 for delivering the animation data A to the animation reproducing terminal 1, in addition to an animation reproducing terminal 1b similar to the animation reproducing terminal 1 shown in FIG. 1.

Note that the animation reproducing terminal 1b is provided with a communication processing section (communication means) 13 for communication with the server device 3, in addition to the arrangement shown in FIG. 1, and thus can receive the animation data via any communication path such as the Internet, a public telephone network, or a LAN, for example. When the data evaluation section 21 judges that the animation reproducing section 12 cannot reproduce the animation data A, the communication processing section 13 may send to the server device 3, a request for resending the animation data A, in accordance with the instructions from the data evaluation section 21. Incidentally, the communication path may be either wired or wireless.

Figure 12:
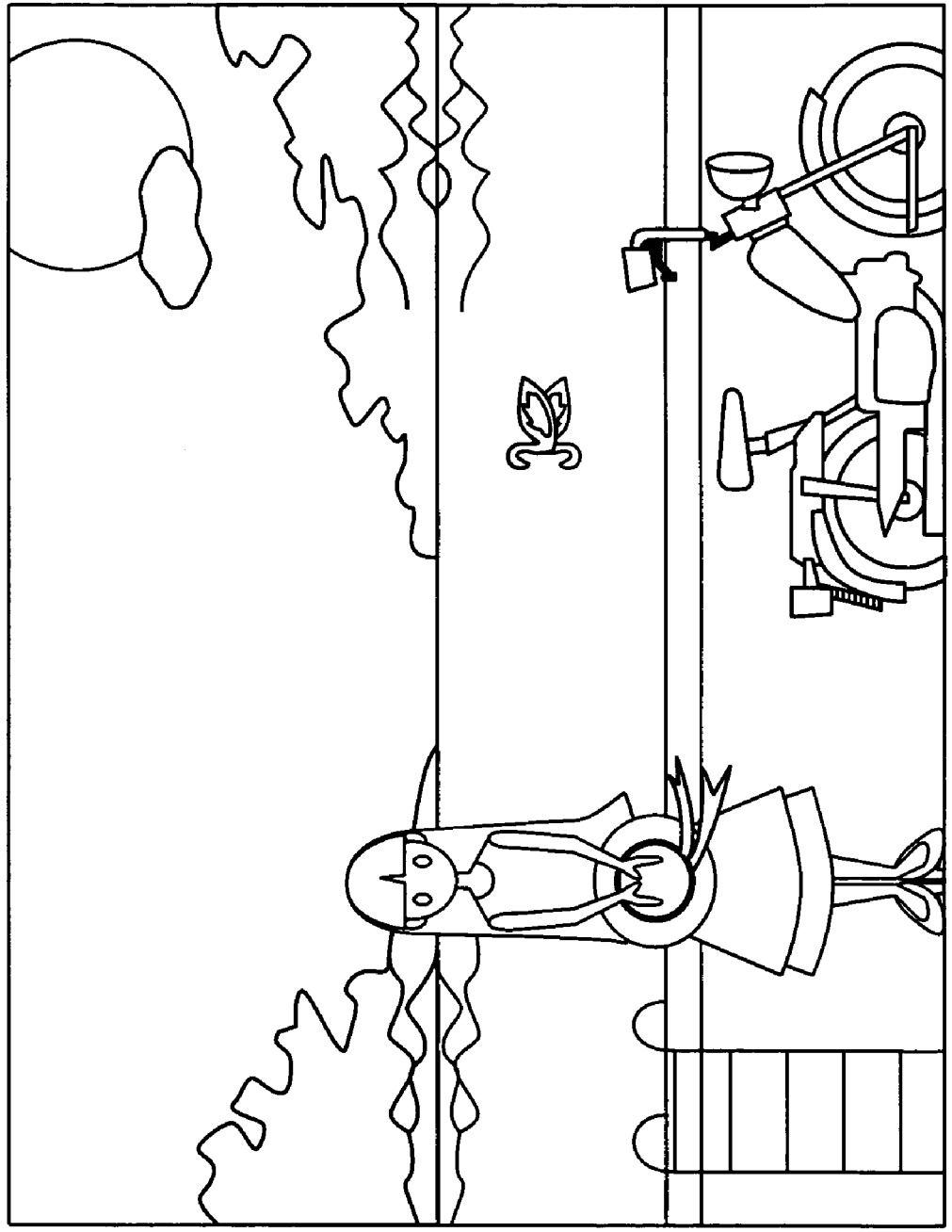
FIG. 12 is an explanatory diagram showing a screen that reproduces the most complicated animation data, which is an example of animation data sent by the server device.
Figure 13:
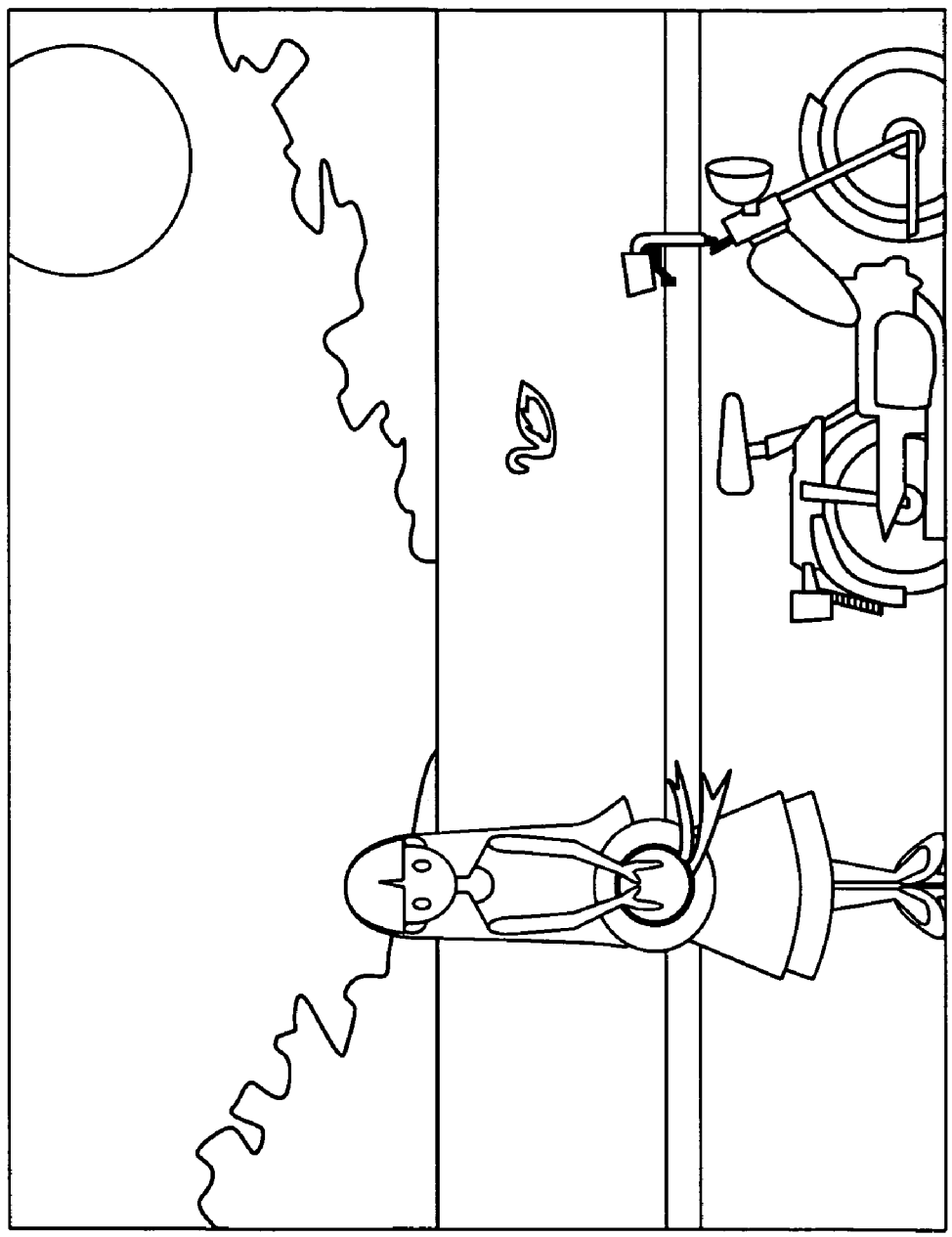
FIG. 13 is an explanatory diagram showing a screen that reproduces second most complicated animation data, which is an example of animation data sent by the server device.
Figure 14:
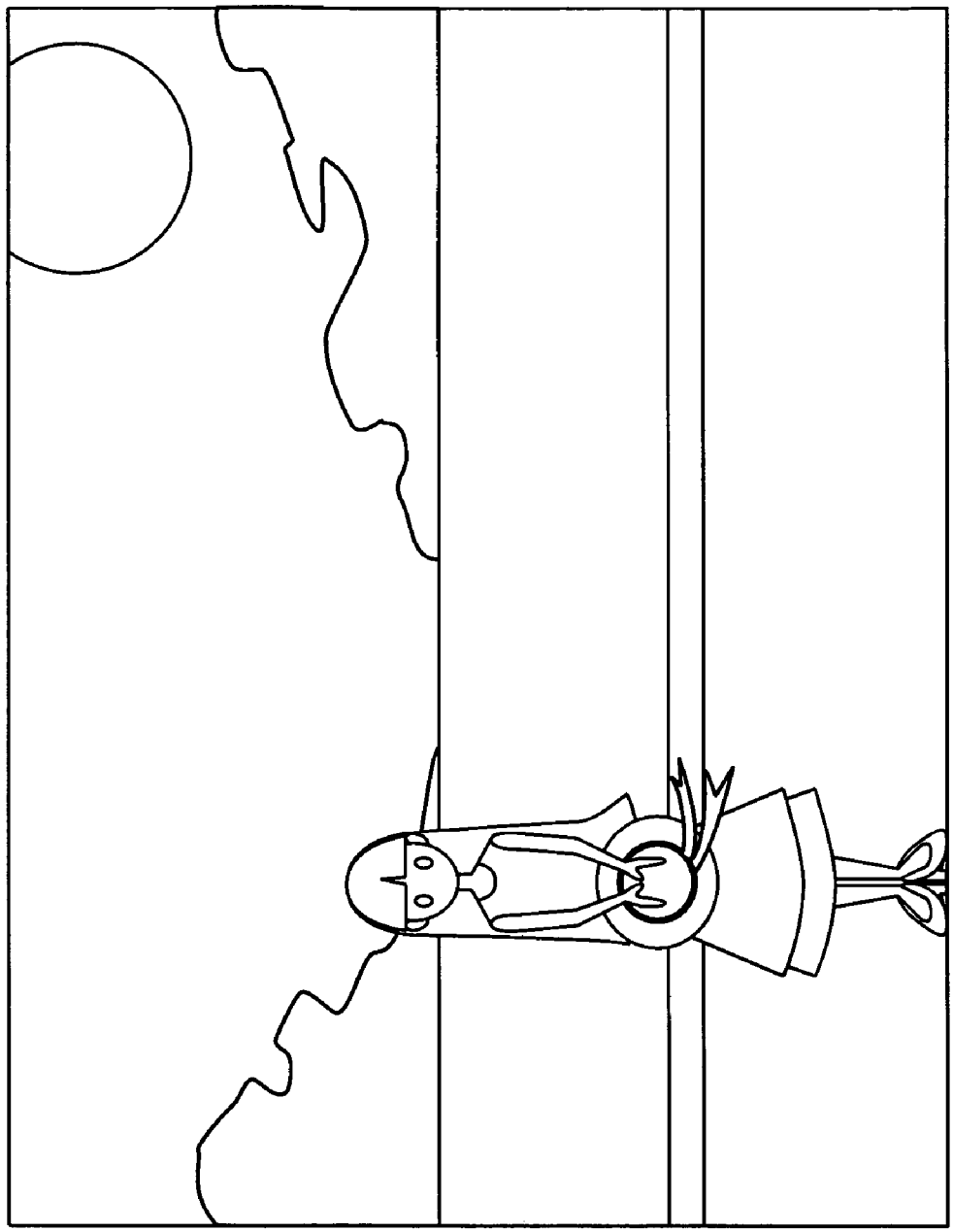
FIG. 14 is an explanatory diagram showing a screen that reproduces the simplest animation data, which is an example of animation data sent by the server device.

On the other hand, the server device 3 is provided with a data storing section 31 for storing the animation data A having the same content but different complexities, a data selecting section 32 for selecting and determining the animation data A to be sent to the animation reproducing terminal 1b from the animation data A, and a communication processing section 33 for sending and receiving data through communication with the animation reproducing terminal 1b, as shown in FIGS. 12 through 14, for example. Note that FIGS. 12 through 14 show key frames displayed based on mutually corresponding key frame data KF among the respective animation data A.

FIG. 12 shows animation data A1 assumed to be reproduced by an animation reproducing terminal 1b having highest throughput. Animation data A2 shown in FIG. 13 is assumed to be reproduced by an animation reproducing terminal 1b having medium throughput. Compared with the animation data A1, the animation data A2 omits pictures such as the ladder at the lower left, the shadows of the bird and the clouds, the clouds over the moon, and the patterns inside the clouds along the sea surface in FIG. 13. Further, animation data A3 shown in FIG. 14 omits the pictures of the bird and the motorbike and simplifies the shape of the clouds, compared with FIG. 13, so as to be reproduced by an animation reproducing terminal 1b having lower throughput compared with the animation data A2. Note that, the animation data A1 and A2 contain the sound data Ea (not shown), but the animation data A3 omits the sound data Ea, and the sound data Ea is not stored in the data storing section 31.

Figures 15, 16:
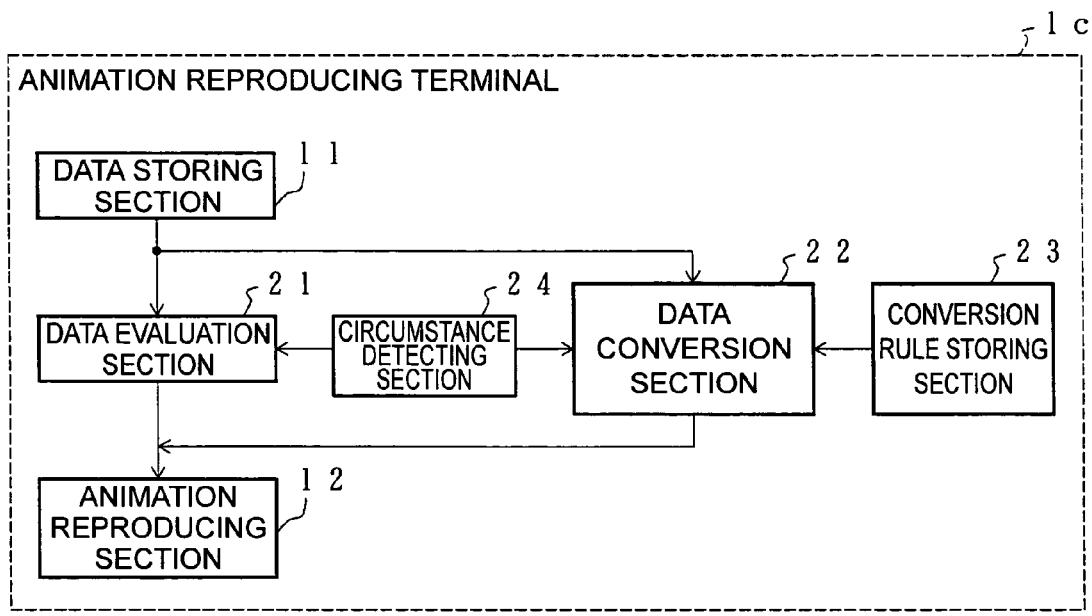
FIG. 15 is an explanatory diagram showing a correspondence table referred to by the server device when selecting animation data to be resent to the animation data terminal.
FIG. 16 in accordance with yet another embodiment of the present invention is a block diagram showing chief members of an arrangement of an animation reproducing terminal.

Further, as shown in FIG. 15, the data selecting section 32 stores data indicating criteria for selecting the animation data A1 through A3. In FIG. 15, the data number is the number for specifying an animation data group having the same content (A1 through A3, for example). For each data number, the data selecting section 32 stores combinations of (i) data constituting the animation data (A1 through A3) contained in the animation data group, and (ii) upper limit values of throughput required for reproducing each of the animation data. In an example of FIG. 15, the server device 3 is set so that the animation data A1 is sent to an animation reproducing terminal 1b whose reference value that indicates the throughput is 100 through ∞; the animation data A2 is sent to an animation reproducing terminal 1b whose reference value is 80 through 1000; and the animation data A3 is sent to an animation reproducing terminal 1b whose reference value is not more than 80.

Note that, in the column of the upper limit of reference value, "∞" indicates infinity, and a possible maximum value of the reference value may be described in practice. The animation data A1 through A3 are stored in combination of (i) file name (data name) that stores the animation data A1 through A3, and (ii) sub data name referred to by the file name, such as file name of sound data, for example.

In this arrangement, when the communication processing section 13 of the animation reproducing terminal 1b receives from the server device 3, the most complicated animation data A1 whose data number is 400, the animation data A1 is stored in the data storing section 11. Further, as in First Embodiment, the data evaluation section 21 evaluates the animation data A1.

Further, when the data evaluation section 21 judges that the animation reproducing section 12 cannot directly reproduce the animation data A1, the data evaluation section 21 instructs the communication processing section 13 to send a resending request message to the server device 3.

The message includes the data number (400) indicating the content of the animation data to be resent, and the reference value (100) indicating the throughput of its own animation reproducing section 12.

On the other hand, when the communication processing section 33 in the server device 3 receives the message, the data selecting section 32 specifies the animation data to be resent based on the message, and read the animation data from the data storing section 31 so as to send the animation data to the communication processing section 13.

Specifically, based on the data number in the message, the data selecting section 32 acquires a table corresponding to the data number as shown in FIG. 15. Further, the data selecting section 32 compares the upper limit values in the table with the reference value in the message, and determines the animation data in conformity to the animation reproducing terminal 1b.

In this example, since the reference value in the message is 100, the data to be resent is determined to be the animation data A2, more specifically the data name 402. dat. Note that, it is not necessary to resend 401. snd, because 401. snd has been already sent together with the animation data A1. With this, the data selecting section 32 reads the animation data A2 from the data storing section 31, and sends the animation data A2 to the communication processing section 13.

In this manner, the animation data A3 is sent to an animation reproducing terminal 1b whose reference value indicating the throughput is not more than 80; the animation data A2 is sent to an animation reproducing terminal 1b whose reference value is 80 through 1000; and the animation data A1 is sent to an animation reproducing terminal 1b whose reference value is greater than 1000.

Note that, the above explanation dealt with a case where the resending request message includes the reference value indicating the throughput of the animation reproducing terminal 1b as an example. But, the message is not limited to this. For example, the message may convey for each type of data whether or not the animation reproducing terminal 1b has ability of reproduction, for example, whether or not the animation reproducing terminal 1b has an ability to reproduce sound data. In this case, the data selecting section 32 can stop the transmission of a file (sub data) for sound reproduction to an animation reproducing terminal 1b which is unable to reproduce sound.

Further, in a case where it is notified that the animation reproducing terminal 1b cannot reproduce sound when determining the animation data to resend, it may be judged that animation data can be reproduced by an animation reproducing terminal 1b whose reference value is lower by an value required for sound data processing. For example, it is assumed here that the lower limit of reference value indicating the throughput required for reproducing the animation data A1 is 1000, and that the reference value required for reproducing sound is 100. In this case, under normal circumstances, an animation reproducing terminal 1b whose reference value is 900, irrespective of with or without a sound reproducing ability, is judged as incapable of reproducing the animation data A1, and thus the animation data A2 is resent. On the other hand, in the case where the animation reproducing terminal 1b whose reference value is lower by a value corresponding to the sound reproducing function is judged as capable of reproducing the animation data A1 when it is notified that the animation reproducing terminal 1b does not have a sound reproducing ability, even the animation reproducing terminal 1b whose reference value is 900 is judged as capable of reproducing the animation data A1, thereby reproducing animation with higher expressiveness. Further, as another method for requesting to resend, the message may convey a method to calculate the reference value, such as weighing factors used when calculating the reference value.

Further, the above explanation dealt with a case where the data storing section 31 stores the animation data A1 through A3 having the same content but different complexities. Instead, the following case may be adopted. Specifically, only the animation data A to be reproduced by an animation reproducing terminal 1b having the most advanced functions is stored. In this case, the server device 3 is provided with a data conversion section for simplifying the animation data A, which is similar to the data conversion section 22 in accordance with Second Embodiment, so as to generate a simplified animation data Aa when receiving the resending request. In either case, the similar effects can be achieved if the server device 3 can send more simplified animation data when receiving the resending request.

Further, the above explanation dealt with a case where the correspondence table shown in FIG. 15 is stored in addition to the animation data A1 through A3 as an example, but the case is not limited to this. For example, each of the animation data, and graphic, image, or sound data that constitutes the animation data may contain its own reference value required for respective reproductions. In this case, when the animation data stored in a server device 3 is copied onto another server device, the correspondence table is not required to be copied together, thereby saving labor in managing the animation data.

FOURTH EMBODIMENT

Incidentally, in Second Embodiment, the conversion rules stored in the conversion rule storing section 23 are stored as rules peculiar to the animation reproducing terminal 1a. On the other hand, the present embodiment will explain an animation reproducing terminal capable of changing conversion rules to be applied in accordance with external circumstances.

As shown in FIG. 16, an animation reproducing terminal 1c in accordance with the present embodiment is provided with a circumstance detecting section (circumstance detecting means) 24 for detecting circumstances regarding conditions outside the animation reproducing terminal 1c (external circumstances), such as position, ambient temperature, and ambient brightness of the animation reproducing terminal 1c. The data evaluation section 21 judges whether or not the animation reproducing section 12 can directly reproduce the animation data A in the present external circumstances, and the data conversion section 22 converts the animation data A into a format reproducible by the animation reproducing section 12 in the present external circumstances.

The following will explain an example where the circumstance detecting section 24 finds out as the external circumstances (i) if it is inappropriate to reproduce sound, as in movie theaters, and (ii) if the surroundings are so bright as to require high contrast display. The circumstance detecting section 24, when detecting the ambient brightness, may directly detect the brightness using a camera and an illumination sensor. Alternatively, the circumstance detecting section 24 may acquire the ambient brightness by detecting the position through a current position search service using a GPS (Global Positioning System) and PHS (PERSONAL HANDYPHONE SYSTEM: Registered Trademark), etc. and by referring to a server device that sends back information about the weather in response to the position information, etc. Further, when detecting whether or not it is inappropriate to reproduce sound, the circumstance detecting section 24 may refer to a server device that responds to the positional information by sending back map information in accordance with the position, and judge whether the animation reproducing terminal 1c is positioned in a place where sound production is prejudged as inappropriate (movie theater, public place, etc.) based on the map information.

On the other hand, as shown in FIG. 17, the conversion rule storing section 23 in accordance with the present embodiment stores the conversion rules shown in FIG. 8, and conditions for applying each conversion rule. In FIG. 17, the conditions indicate the circumstances detected by the circumstance detecting section 24. "BW mode" indicates that the conversion rule is applied when the external circumstances are judged to require high contrast display because the surroundings are bright. On the other hand, "sound off" indicates that the conversion rule is applied when sound reproduction is judged as inappropriate. Note that, where the condition is not specified, the conversion rule is applied irrespective of the external circumstances. Further, it may be adopted for a plurality of conditions to associate with a conversion rule.

In the arrangement, when the surroundings of the animation reproducing terminal 1c are bright, the data evaluation section 21 judges whether or not the animation reproducing section 12 can display the animation data A in high contrast, and the data conversion section 22 applies a rule for high contrast display ("BW mode" rule) so as to reproduce the animation in high contrast. On the other hand, when the animation reproducing terminal 1c is placed where sound reproduction is inappropriate, the data evaluation section 21 judges whether or not the animation reproducing section 12 has throughput enough to reproduce the animation data A except sound, and the data conversion section 22 applies a rule for not reproducing sound ("sound off" rule) so as to reproduce the animation data except the sound.

Note that the above explanation dealt with a case where the circumstance detecting section 24 automatically acquires the external circumstances of the animation reproducing terminal 1c as an example, but whether or not sound reproduction is appropriate and whether or not high contrast display is required may be detected by user's operation. However, when the circumstance detecting section 24 judges the external circumstances using a sensor, etc., as in the present embodiment, it is possible to reproduce the animation after the converting the animation data A into the appropriate animation data A without user's setting.

Incidentally, the above explanation dealt with an example where the conditions for applying the conversion rules are the external circumstances detected by the circumstance detecting section 24, but the conditions may be the throughput of the animation reproducing section 12, for example. Specifically, the data conversion section 22 may apply the conversion rule under the "BW mode" condition when the animation reproducing section 12 can display only monochrome two tone gradations. In this case, it is possible to select an applying conversion rule in accordance with the throughput of the animation reproducing section 12 among the conversion rules stored in the conversion rule storing section 23. Thus, a plurality of animation reproducing terminals 1c, such as devices having the same basic configuration in terms of a CPU and memory capacity, etc., but having display devices with different display ability, can commonly use the same conversion rule table.

Note that, in First through Fourth Embodiments, members that compose the animation reproducing terminals 1 through 1c and the server device 3 may be a functional block which is realized in such a manner that computing means such as a CPU executes a program stored in a recording medium such as an ROM and an RAM, or may be hardware which performs similar processing. Further, the members can also be realized by combining hardware that performs part of processing with the computing means that executes a program for controlling the hardware and performing remaining processings. Further, the computing means may be a single unit, or may be a plurality of computing means connected with one another via buses and various communication paths in the device to jointly execute a program.

The program is delivered in the form of a recording medium which stores program data indicating the program itself and program data for creating the program, or through wired or wireless communication means which transmits the program data. The program is then executed by the computing means.

Here, the recording medium is may be removable when delivering the program data. But the recording medium after delivering the program data may or may not be removable. Further, the recording medium, as long as it stores the program data, may or may not be rewritable (writable) or volatile, and may have any recording method and shape. An example of the recording medium includes a tape such as a magnetic tape and a cassette tape, and a magnetic disk such as a floppy disk and a hard disk, or a disk such as a CD-ROM, a magnetic optical disk (MO), a mini disc (MD), and a digital video disk (DVD). Further, the recording medium may be a card such as an IC card and an optical card, or a semiconductor memory such as a mask ROM, an EPROM, an EEPROM, or a flash ROM.

Note that the program data may be a code that instructs the computing means in all procedures for the processing. Alternatively, if there exists a basic program (operating system or library, for example) that can execute part or all of the processing by calling them in a predetermined procedure, a code or pointer for instructing the computing means to call the basic program may replace part or all of the procedures.

Further, a format in which the recording medium stores the program data may be a storing format that is executable through the access by the computing means, as the program data located on an actually memory, for example; a storing format after installed on a local recording medium (actual memory or hard disk, for example) that is constantly accessible by the computing means, before located on the actual memory; or a storing format before installed on the local recording medium from a network and a removable recording medium. Further, the program data is not limited to an object code after compiling, but may be stored as a source code, and an intermediate code created in the course of interpreting or compiling. In any case, the same effects can be achieved irrespective of the format for storing the program data on the recording medium, as long as the program data can be converted into a format executable by the computing means by means of uncompressing, decoding, interpreting, compiling, linking, and locating on the actual memory, or their combination.

Further, the animation data A can be delivered similarly to the case where the program data is delivered. A medium to store the animation data A may be any recording medium as described above. However, since high-speed access is required for reproducing animation, even when a secondary recording medium such as a hard disk stores the animation data A among the recording media as described above, a recording medium having a high access rate, such as an RAM, for example, temporarily stores the animation data A before access.

As described above, an animation reproducing terminal of the present invention that includes reproducing means for reproducing animation data which express each frame of animation in a combination of a plurality of element graphics is characterized by including data evaluation means for evaluating complexity of animation data based on the number of element graphics contained in a frame of the animation data, before the reproducing means reproduces the animation data; and control means for judging whether or not the reproducing means is able to directly reproduce the animation data based on an evaluation result of the evaluation means, and for carrying out a predetermined processing when the reproducing means is not able to directly reproduce the animation data, the predetermined processing being for a case where the reproducing means has an insufficient ability.

With this arrangement, the data evaluation means evaluates the complexity of animation data based on the number of element graphics contained in a frame of the animation data, and the control means judges whether or not the reproducing means can directly reproduce the animation data based on an evaluation result of the evaluation means. When the reproducing means cannot directly reproduce the animation data, the control means carries out a predetermined processing prepared for a case where the reproducing means has an insufficient ability. For example, the control means notifies the user of the incapability of reproduction, converts the animation data into animation data reproducible by the reproducing means, or, when the animation data is sent from a server, requests the server to resend animation data in a format reproducible by the reproducing means. On the other hand, when the reproducing means has throughput enough for reproducing the animation data, the control means allows the reproducing means to reproduce the animation data.

With this arrangement, the complexity of each animation data to be reproduced by the reproducing means is evaluated based on the number of element graphics contained in the animation data, and whether or not the reproducing means can directly reproduce the animation data is judged based on a judgment result. Thus, this judgment requires a computing amount smaller than in a case where the animation data is actually reproduced.

Further, the complexity of animation data is evaluated before the reproducing means reproduces the animation data, and when the animation data cannot be directly reproduced, a predetermined processing is carried out. This prevents an animation reproducing terminal having insufficient throughput from directly reproducing the animation data.

As a result, with a small computing amount, it is possible to prevent defects such that (A) animation having many missing frames is reproduced when an animation reproducing terminal having insufficient throughput tries to reproduce too complicated animation data for the throughput, and (B) the intention of animation cannot be conveyed when an animation reproducing terminal incapable of outputting sound tries to reproduce animation data containing sound.

In addition to the above-described arrangement, when the animation data includes only key frames which are part of frames that constitute the animation, and the reproducing means creates a frame by interpolating the key frames when reproducing the animation data, the data evaluation means counts vertices of a graphic that constitutes the frame as the number of the element graphics.

With this arrangement, the data evaluation means counts vertices of a graphic that constitutes the frame as the number of the element graphics so as to evaluate the complexity of the animation data. Here, when graphics are plotted to reproduce the animation data, a throughput required for the plotting depends on the numbers of vertices and sides that constitute each graphic, and an area to be painted. Further, when the key frames are interpolated to create a frame, a throughput required for the interpolation depends on the number of vertices that constitute each graphic. Here, the number of sides is roughly determined by the number of vertices.

Therefore, by counting the number of vertices of a graphic that constitutes a frame to estimate the complexity of the animation data, it is possible to roughly estimate the complexity of the animation data, while requiring a computing amount much smaller than in a case where the estimation is based on the numbers of vertices and sides, and the painting area.

In addition to the above-described arrangement, the control means may notify a user of incapability of reproduction as the processing for the case where the ability is insufficient. With this arrangement, animation data is directly reproduced when the animation data can be directly reproduced with the throughput of the reproducing means, while the incapability of reproduction is notified to the user when the animation data cannot be reproduced, even if the animation data all have the same form. Thus, the user can be promptly informed that the animation data cannot be reproduced on the animation reproducing terminal.

Further, instead of notifying the user, the control means may delete or convert into data reproducible with throughput of the reproducing means, data that is not directly reproducible by the reproducing means among data contained in the animation data, as the processing for the case where the ability is insufficient.

With this arrangement, before reproducing each animation data, whether or not the animation data can be reproduced is judged based on the complexity of the animation data with a small computing amount. For example, when a reproducing ability itself such as a sound output ability is not provided, or when throughput required for reproduction is not sufficient as in a case where a frame contains many graphics, for example, the control means judges that the reproducing means cannot directly reproduce the animation data. In this case, the control means creates animation data that the reproducing means can sufficiently reproduce, by deleting the irreproducible data type or by converting graphic data having a complicated shape into graphic data having a simple shape, for example.

With this arrangement, animation data is directly reproduced when the animation data can be directly reproduced with the throughput of the reproducing means, while the animation data having the same form is reproduced after converted into reproducible animation data by data deletion and conversion, etc. when the animation data cannot be reproduced. As a result, with respect to each different animation data, it is possible to reproduce animation with quality as high as possible in accordance with the throughput of the reproducing means of the animation reproducing terminal.

Further, instead of data conversion by the control means, the animation reproducing terminal may include communication means for communicating with a delivering device that can deliver animation data respectively having different complexities, the control means causing the communication means to request that, if the animation data evaluated by the data evaluation means is sent from the delivering device, the delivering device resend a simpler animation data than the animation data, as the processing for the case where the ability is insufficient.

With this arrangement, when the control means evaluates the animation data and judges that the reproducing means cannot directly reproduce the animation data, the communication means requests the delivering device that delivers the animation data to resend animation data. When the delivering device resends the animation data in response to the request, the animation reproducing terminal receives the animation data and allows the reproducing means to reproduce the animation data. Here, the resent animation data is simpler than the evaluated animation data, and thus can be reproduced with lower throughput. Hence, even when the reproducing means cannot directly reproduce the evaluated animation data, the reproducing means can reproduce the new animation data. Note that, when the new animation data still cannot be reproduced, the control means may cause the communication device to request resending of animation data again.

With this arrangement, whether resending is required or not is judged with respect to each animation data. Thus, even if the animation data have the same form, only the animation data that cannot be directly reproduced is resent from the delivering device, so as to be replaced with animation data reproducible by the reproducing means. Thus, as in the case where the control means of the animation reproducing terminal converts (deletes) data, the animation reproducing terminal can reproduce animation with quality as high as possible in accordance with the throughput of the reproducing means of the animation reproducing terminal, with respect to each different animation data.

On the other hand, another exemplary animation reproducing terminal of the present invention which includes reproducing means for reproducing animation data is characterized by including communication means for communicating with a delivering device that can deliver animation data respectively having different complexities; data evaluation means for evaluating complexity of the animation data, before the reproducing means reproduces the animation data; and control means for judging whether or not the reproducing means is able to directly reproduce the animation data based on an evaluation result of the evaluation means, and for causing the communication means to request that the delivering device resend animation data simpler than the evaluated animation data when the reproducing means is not able to directly reproduce the animation data. Note that, the complexity of the animation data is evaluated by factors such as a throughput required for the reproducing means to reproduce the animation data.

With this arrangement, before reproducing each animation data, the data evaluation means of the animation reproducing terminal evaluates the complexity of the animation data. Further, when the reproducing means of the animation reproducing terminal cannot directly reproduce the animation data, the communication means, when received the instruction of the control means, requests the delivering device to resend animation data simpler than the evaluated animation data.

With this arrangement, whether resending is required or not is judged with respect to each animation data. Thus, even if the animation data have the same form, only the animation data that cannot be directly reproduced is resent from the delivering device, so as to be replaced with animation data reproducible by the reproducing means. As a result, with respect to each different animation data, it is possible to reproduce animation with quality as high as possible in accordance with the throughput of the reproducing means of the animation reproducing terminal.

Incidentally, when the delivering device resends the animation data, the resent animation data is simpler than the animation data before being resent, and thus can be reproduced by reproducing means whose throughput is low. However, when the throughput of the reproducing means of the animation reproducing terminal that requested the resending is much lower than the level assumed by the delivering device, the reproducing means may not be able to directly reproduce even the resent animation data.

Thus, in each of the above-described arrangements that involves resending, when the control means judges that the reproducing means cannot directly reproduce the animation data that is evaluated by the data evaluation means, the control means controls the communication means to notify the delivering device of a reason for a judgment and to request that the delivering device resend animation data which is directly reproducible by the reproducing means. Note that, the communication means may notify the delivering means of the data whose type cannot be reproduced by the reproducing means, such as sound data or data in a particular format that cannot be reproduced in the animation data, or conversely, the communication means may notify the delivering means of the data whose type can be reproduced by the reproducing means, so as to indicate the incapability of reproduction due to the data types. Further, the insufficient ability of the reproducing means may be notified in terms of the throughput of the reproducing means, an equation for calculating a throughput for the reproducing means to reproduce the animation data, and the like.

With this arrangement, when the communication means of the animation reproducing terminal requests the delivering device to resend animation data, the communication means notifies the delivering device of a reason why the reproducing means of the animation reproducing terminal cannot directly reproduce the animation data before being resent, and instructs the delivering device to resend the animation data directly reproducible by the reproducing means. With this, irrespective of the throughput of the reproducing means of the animation reproducing terminal, the delivering device can resend the animation data directly reproducible by the reproducing means of the animation reproducing terminal. This prevents repetitious resending, thereby reducing an amount of data transmitted through a communication path between the delivering device and the animation reproducing terminal, and time required for preparing to reproduce the animation data.

Incidentally, the capability of reproduction and the most appropriate animation data depend on not only the throughput of the reproducing means itself, but also the external circumstances of the animation reproducing terminal. For example, it is inappropriate to make a sound in movie theaters, etc., and it is desired to increase contrast when the surroundings are bright. Thus, when an animation reproducing terminal always acquires the new animation data uniformly by data conversion, the animation data may be appropriate in one external circumstances, but may not be appropriate in another external circumstances.

On the other hand, a further exemplary animation reproducing terminal of the present invention which includes reproducing means for reproducing animation data is characterized by including circumstance detecting means for detecting external circumstances of the animation reproducing terminal; data evaluation means for evaluating complexity of animation data, before the reproducing means reproduces the animation data; and control means for converting the animation data into animation data that is reproducible in present external circumstances, by deleting or converting data that is not reproducible in the present external circumstances among the animation data in accordance with an evaluation result by the data evaluation means and the external circumstances detected by the circumstance detecting means. Note that, the external circumstances are conditions outside the animation reproducing terminal, such as position, ambient temperature, and ambient brightness of the animation reproducing terminal. The external circumstances may be detected using a sensor, or may be acquired by referring to a server device that sends back weather or map information in response to position information, and the like. Further, the conditions may be detected through user's setting and instruction.

With this arrangement, the circumstance detecting means detects the external circumstances of the animation reproducing terminal, and the data evaluation means evaluates the complexity of each animation data before reproducing the animation data. Further, in accordance with the complexity of the animation data to be reproduced and the external circumstances, when the control means judges that the reproducing means cannot reproduce the animation data in the present external circumstances, the control means converts the animation data into animation data that is reproducible in the present external circumstances.

With this, it is possible to surely prevent defects such that animation having many missing frames is reproduced, when the animation reproducing terminal, which does not have sufficient throughput in the present external circumstances, tries to reproduce animation data which is too complicated for the throughput, even if the animation reproducing terminal is all the same; and it is possible to convert an animation reproducing terminal into the most appropriate animation reproducing terminal in the present external circumstances.

Further, instead of deleting or converting data that is not reproducible in the present external circumstances among the animation data, the control means may convert the animation data into animation data that is appropriately reproducible in present external circumstances, by deleting or converting data that is not appropriately reproducible in the present external circumstances among the animation data.

In this case, since data deletion/conversion is adjusted in accordance with the external circumstances, it is possible to surely prevent defects such that animation having many missing frames is reproduced, when the animation reproducing terminal, which does not have sufficient throughput in the present external circumstances, tries to reproduce animation data which is too complicated for the throughput, even if the animation reproducing terminal is all the same; and it is possible to convert an animation reproducing terminal into the most appropriate animation reproducing terminal in the present external circumstances.

Further, an animation reproducing method of the present invention that includes the step of reproducing animation data which express each frame of animation in a combination of a plurality of element graphics is characterized by including the steps of evaluating complexity of the animation data based on the number of element graphics contained in a frame of the animation data, before the reproducing step; and judging whether or not the animation data is directly reproducible in the reproducing step based on an evaluation result of the evaluation means, and for carrying out a predetermined processing when the reproducing means is not able to directly reproduce the animation data, the predetermined processing being for a case where the reproducing means has an insufficient ability. Note that, the steps as described above and the steps as described later may be carried out with a single device, or may be carried out jointly with a plurality of devices which can be communicated with one another. For example, in an arrangement where the delivering device delivers animation data to the animation reproducing terminal, when the delivering device carries out the step of evaluating the animation data while the animation reproducing terminal carries out the reproducing step, a throughput for the animation reproducing terminal can be further reduced, thereby saving the throughput of the animation reproducing terminal which is lower than that of the delivering device.

With this arrangement, the complexity of the animation data is evaluated based on the number of element graphics that constitute a frame of the animation data, before the reproducing step and, when the animation data is judged as incapable of being directly reproduced, a predetermined processing is carried out, such as notifying the user of the incapability of reproduction, converting the animation data into a reproducible form, and requesting a server that sent the animation data to resend animation data in a reproducible form, for example.

With this, as in the above-described animation reproducing terminal, with a small computing amount, it is possible to prevent defects such that (A) animation having many missing frames is reproduced when an animation reproducing terminal having insufficient throughput tries to reproduce too complicated animation data for the throughput, and (B) the intention of animation cannot be conveyed when an animation reproducing terminal incapable of outputting sound tries to reproduce animation data containing sound.

Further, another exemplary animation reproducing method of the present invention which includes the step of reproducing animation data by an animation reproducing terminal is characterized by including the steps of evaluating complexity of the animation data before the reproducing step; and judging whether or not the animation data is directly reproducible in the reproducing step based on an evaluation result of the evaluation means, and communicating with a delivering device that can deliver animation data respectively having different complexities so as to request that the delivering device resend animation data simpler than the evaluated animation data when the animation data is not directly reproducible.

With this, as in the above-described animation reproducing terminal, whether resending is required or not is judged with respect to each animation data. Thus, even if the animation data have the same form, only the animation data that cannot be directly reproduced is resent from the delivering device, so as to be replaced with animation data reproducible by the reproducing means. Thus, the animation reproducing terminal can reproduce animation with quality as high as possible in accordance with the throughput of the animation reproducing terminal, with respect to each different animation data.

A further exemplary animation reproducing method of the present invention which includes the step of reproducing animation data by an animation reproducing terminal is characterized by including the steps of detecting external circumstances of the animation reproducing terminal; evaluating complexity of the animation data before the reproducing step; and converting the animation data into animation data that is reproducible in present external circumstances, by deleting or converting data that is not reproducible in the present external circumstances among the animation data in accordance with the detected external circumstances and an evaluation result.

Further, instead of deleting or converting data that is not reproducible in the present external circumstances, the animation reproducing method may have the step of converting the animation data into animation data that is appropriately reproducible in present external circumstances, by deleting or converting data that is not appropriately reproducible in the present external circumstances among the animation data.

With these arrangements, as in the above-described animation reproducing terminal having the circumstance detecting means, the complexity of the animation data is evaluated before the animation data is reproduced, and, when the animation data cannot be directly reproduced (is inappropriate to be reproduced) in the present external circumstances, the animation data is converted into animation data in accordance with the present external circumstances.

As a result, it is possible to surely prevent defects such that animation having many missing frames is reproduced, when the animation reproducing terminal, which does not have sufficient throughput in the present external circumstances, tries to reproduce animation data which is too complicated for the throughput, even if the animation reproducing terminal is all the same; and it is possible to convert an animation reproducing terminal into the most appropriate animation reproducing terminal in the present external circumstances.

Incidentally, the animation reproducing terminal may be realized on hardware, or may be realized on a program which is to be executed by a computer. When the program is executed, the computer operates as the animation reproducing terminal. As a result, as in the above-described animation reproducing terminals, it is possible to prevent defects such that (A) animation having many missing frames is reproduced when an animation reproducing terminal having insufficient throughput tries to reproduce too complicated animation data for the throughput, and (B) the intention of animation cannot be conveyed when an animation reproducing terminal incapable of outputting sound tries to reproduce animation data containing sound.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, an animation reproducing terminal, an animation reproducing method, and a program thereof in accordance with the present invention can prevent defects that animation in which data of some types are missing and animation having many missing frames are reproduced, even when animation reproducing terminals having a variety of throughputs reproduce animation data having various complexities. Therefore, it is possible to realize a portable animation reproducing terminal capable of exchanging information intuitively and efficiently by reproducing video images and animation, such as a cellular phone and a portable information terminal device, for example.

What is claimed is:

1. An animation reproducing terminal that includes reproducing means for reproducing animation data which express each frame of animation in a combination of a plurality of element data, comprising:

data evaluation means for evaluating complexity of animation data based on the number of element data contained in a frame of said animation data and a weighting associated with each element data, before said reproducing means reproduces said animation data; and control means for judging whether or not said reproducing means is able to directly reproduce said animation data based on an evaluation result of said evaluation means, and for carrying out a predetermined processing when said reproducing means is not able to directly reproduce said animation data, the predetermined processing is for a case where said reproducing means has an insufficient ability, and the weighting associated with each element data is specific to the animation reproducing terminal.

2. The animation reproducing terminal as set forth in claim 1, wherein:

said animation data includes only key frames which are part of frames that constitute the animation;

said reproducing means creates a frame by interpolating the key frames when reproducing said animation data; and said data evaluation means counts vertices of a graphic that constitutes the frame as the number of the element graphics.

3. The animation reproducing terminal as set forth in claim 1, wherein:

said control means notifies a user of incapability of reproduction, as the processing for the case where the ability is insufficient.

4. The animation reproducing terminal as set forth in claim 1, wherein:

said control means deletes or converts into data reproducible with throughput of said reproducing means, data that is not directly reproducible by said reproducing means among data contained in said animation data, as the processing for the case where the ability is insufficient.

5. The animation reproducing terminal as set forth in claim 1, further comprising:

communication means for communicating with a delivering device that can deliver animation data respectively having different complexities, said control means causing said communication means to request that, if said animation data evaluated by said data evaluation means is sent from the delivering device, the delivering device resend a simpler animation data than said animation data, as the processing for the case where the ability is insufficient.

6. An animation reproducing method that includes reproducing animation data which express each frame of animation in a combination of a plurality of element data, comprising:

evaluating complexity of said animation data based on the number of element data contained in a frame of said animation data and a weighting associated with each element data, before reproducing animation data; and judging whether or not a reproducing module is able to directly reproduce said animation data based on an evaluation result of an evaluation module, and for carrying out a predetermined processing when said reproducing module is not able to directly reproduce said animation data, where the predetermined processing is for a case where said reproducing module has an insufficient ability, and the weighting associated with each element data is specific to the animation reproducing terminal.

7. A computer readable medium storing program instructions for performing a method for reproducing animation data, the method executed by a processor, the method comprising:

evaluating complexity of animation data based on the number of element data contained in a frame of said animation data and a weighting associated with each element data;

judging whether or not said animation data is able to be directly reproduced based on an evaluation result, and carrying out a predetermined processing when said animation data is not able to be directly reproduced, wherein the predetermined processing is for a case where there is an insufficient ability and wherein the weighting associated with each element data is specific to the animation terminal; and reproducing animation data which express each frame of animation in a combination of a plurality of element graphics.

8. An animation reproducing terminal for reproducing animation data, comprising:

reproducing section for reproducing animation data which express each frame of animation in combination of a plurality of element data;

data evaluation section for evaluating complexity of animation data based on the number of element data contained in a frame of said animation data and a weighting with each element data, before said reproducing section reproduces said animation data; and control section module for judging whether or not said reproducing section is able to directly reproduce said animation data based on an evaluation result of said evaluation section, and for carrying out a predetermined processing when said reproducing section is not able to directly reproduce said animation data, wherein the predetermined processing is for a case where said reproducing section has an insufficient ability, and wherein the weighting associated with each element data is specific to the animation reproducing terminal.

9. The animation reproducing terminal as set forth in claim 8, wherein:

said animation data includes only key frames which are part of frames that constitute the animation;

said reproducing section creates a frame by interpolating the key frames when reproducing said animation data; and said data evaluation section counts vertices of a graphic that constitutes the frame as the number of the element graphics.

10. The animation reproducing terminal as set forth in claim 8, wherein:

said control section notifies a user of incapability of reproduction, as the processing for the case where the ability is insufficient.

11. The animation reproducing terminal as set forth in claim 8, wherein:

said control section deletes or converts into data reproducible with throughput of said reproducing section, data that is not directly reproducible by said reproducing section among data contained in said animation data, as the processing for the case where the ability is insufficient.

12. The animation reproducing terminal as set forth in claim 8, further comprising:

communication section for communicating with a delivering device that can deliver animation data respectively having different complexities, said control section causing said communication section to request that, if said animation data evaluated by said data evaluation section is sent from the delivering device, the delivering device resend a simpler animation data than said animation data, as the processing for the case where the ability is insufficient.

13. The animation reproducing terminal as set forth in claim 12, wherein:

when said control section judges that said reproducing section is not able to directly reproduce said animation data that is evaluated by said data evaluation means, said control section controls said communication section to notify the delivering device of a reason for a judgment and to request that the delivering device resend animation data that is directly reproducible by said reproducing section.

14. The animation reproducing terminal as set forth in claim 2, wherein:

said control means notifies a user of incapability of reproduction, as the processing for the case where the ability is insufficient.

15. The animation reproducing terminal as set forth in claim 2, wherein:

said control means deletes or converts into data reproducible with throughput of said reproducing means, data that is not directly reproducible by said reproducing means among data contained in said animation data, as the processing for the case where the ability is insufficient.

16. The animation reproducing terminal as set forth in claim 2, further comprising:

communication means for communicating with a delivering device that can deliver animation data respectively having different complexities, said control means causing said communication means to request that, if said animation data evaluated by said data evaluation means is sent from the delivering device, the delivering device resend a simpler animation data than said animation data, as the processing for the case where the ability is insufficient.

17. The animation reproducing terminal as set forth in claim 5, wherein:

when said control means judges that said reproducing means is not able to directly reproduce said animation data that is evaluated by said data evaluation means, said control means controls said communication means to notify the delivering device of a reason for a judgment and to request that the delivering device resend animation data that is directly reproducible by said reproducing means.

18. The animation reproducing terminal as set forth in claim 9, wherein:

said control section notifies a user of incapability of reproduction, as the processing for the case where the ability is insufficient.

19. The animation reproducing terminal as set forth in claim 9, wherein:

said control section deletes or converts into data reproducible with throughput of said reproducing section, data that is not directly reproducible by said reproducing section among data contained in said animation data, as the processing for the case where the ability is insufficient.

20. The animation reproducing terminal as set forth in claim 9, further comprising:

communication section for communicating with a delivering device that can deliver animation data respectively having different complexities, said control section causing said communication section to request that, if said animation data evaluated by said data evaluation section is sent from the delivering device, the delivering device resend a simpler animation data than said animation data, as the processing for the case where the ability is insufficient.

21. A frame data reproducing terminal that includes reproducing means for reproducing frame data which express each frame in a combination of a plurality of element data, comprising:

data evaluation means for evaluating complexity of frame data based on the number of element data contained in a frame of said frame data and a weighting associated with each element data, before said reproducing means reproduces said frame data; and control means for judging whether or not said reproducing means is able to directly reproduce said frame data based on an evaluation result of said evaluation means, and for carrying out a predetermined processing when said reproducing means is not able to directly reproduce said frame data, where the predetermined processing is for a case where said reproducing means has an insufficient ability, and where the weighting associated with each element data is specific to the frame data reproducing terminal.

22. The frame data reproducing terminal as set forth in claim 21, wherein:

said control means notifies a user of incapability of reproduction, as the processing for the case where the ability is insufficient.

23. The frame data reproducing terminal as set forth in claim 21, wherein:

said control means deletes or converts into data reproducible with throughput of said reproducing means, data that is not directly reproducible by said reproducing means among data contained in said frame data, as the processing for the case where the ability is insufficient.

24. The frame data reproducing terminal as set forth in claim 21, further comprising:

communication means for communicating with a delivering device that can deliver frame data respectively having different complexities, said control means causing said communication means to request that, if said frame data evaluated by said data evaluation means is sent from the delivering device, the delivering device resend a simpler frame data than said frame data, as the processing for the case where the ability is insufficient.

25. A frame data reproducing method that includes reproducing frame data which express each frame in a combination of a plurality of element data, comprising:

evaluating complexity of said frame data based on the number of element data contained in a frame of said frame data and a weighting associated with each element data, before reproducing frame data; and judging whether or not a reproducing section is able to directly reproduce said frame data based on an evaluation result of an evaluation section, and for carrying out a predetermined processing when said reproducing section is not able to directly reproduce said frame data, where the predetermined processing is for a case where said reproducing section has an insufficient ability, and wherein the weighting associated with each element data is specific to the a frame data reproducing terminal.

26. A frame data reproducing method which includes reproducing frame data which express each frame in a combination of a plurality of element graphics by a frame data reproducing terminal, comprising:

evaluating complexity of said frame data before reproducing frame data; and judging whether or not said frame data is directly reproducible based on an evaluation result of an evaluation section, and communicating with a delivering device that can deliver frame data respectively having different complexities so as to request that the delivering device resend frame data simpler than said evaluated frame data when said frame data is not directly reproducible.

27. A computer readable medium storing program instructions for performing a method for reproducing frame data, the method executed by a processor, the method comprising:

evaluating complexity of frame data based on the number of element data contained in a frame of said frame data;

judging whether or not said frame data is able to be directly reproduced based on an evaluation result and a weighting associated with each element data, and carrying out a predetermined processing when said frame data is not able to be directly reproduced, where the predetermined processing being for a case where there is an insufficient ability, and the weighting associated with each element data is specific to a frame data reproducing terminal; and reproducing frame data which express in a combination of a plurality of element graphics.

* * * * *